United States Patent [19]
Wusterbarth et al.

[11] Patent Number: 6,053,054
[45] Date of Patent: Apr. 25, 2000

[54] GAS FLOW RATE MEASUREMENT APPARATUS AND METHOD

[75] Inventors: Michael A. Wusterbarth; Steven Noyes, both of Chandler; Joe Russell Greer, Phoenix, all of Ariz.

[73] Assignee: FTI Flow Technology, Inc., Phoenix, Ariz.

[21] Appl. No.: 08/938,397

[22] Filed: Sep. 26, 1997

[51] Int. Cl.⁷ .................................................. G01F 1/66
[52] U.S. Cl. ........................................................ 73/861.28
[58] Field of Search ............................... 73/198, 861.28, 73/861.357, 204.27

[56] References Cited

U.S. PATENT DOCUMENTS

| | | | |
|---|---|---|---|
| 3,241,366 | 3/1966 | Allen | 73/230 |
| 3,301,052 | 1/1967 | Lee et al. | 73/231 |
| 3,710,622 | 1/1973 | Hammond et al. | 73/231 |
| 3,733,898 | 5/1973 | Yamamoto et al. | |
| 3,934,473 | 1/1976 | Griffo | 73/231 R |
| 4,332,165 | 6/1982 | Kawai et al. | 73/204 |
| 4,417,471 | 11/1983 | Kawai et al. | 73/204 |
| 4,534,226 | 8/1985 | Rose | 73/861.84 |
| 5,483,829 | 1/1996 | Caron | |
| 5,509,305 | 4/1996 | Hussain et al. | 73/195 |
| 5,531,126 | 7/1996 | Drahm | |
| 5,535,633 | 7/1996 | Kofoed et al. | 73/861.052 |
| 5,596,969 | 1/1997 | Lipinski | |
| 5,689,071 | 11/1997 | Ruffner et al. | 73/861.84 |

OTHER PUBLICATIONS

Today's CVS System, Wusterbarth, Michael A.

Primary Examiner—Benjamin R. Fuller
Assistant Examiner—Jewel V. Thompson
Attorney, Agent, or Firm—Richard E. Oney

[57] ABSTRACT

A gas flow rate measurement apparatus for obtaining a normalized flow rate of a gas having at least one liquid component. The gas travels from an upstream position and in a downstream direction. The gas flow rate measurement apparatus comprises a gas inlet conduit in the upstream position for receiving the gas; a gas flow conditioning section in fluid communication with the gas inlet conduit and in a first downstream position for conditioning the gas to vaporize substantially all of the at least one liquid component without adding any other gas; a flow rate measurement section in fluid communication with the gas flow conditioning section and in a second downstream position more distant from the upstream position than the first downstream position, the flow rate measurement section including at least one sensor for sensing at least one state variable for the gas and generating at least one gas state signal, and a flow rate sensor for measuring an actual flow rate of the gas and generating a flow rate signal, and a processing device operatively coupled to the flow rate measurement section for using the at least one gas state signal and the flow rate signal to obtain the normalized mass flow rate. A related method also is provided.

34 Claims, 22 Drawing Sheets

START UP ROUTINE

CALIBRATION ROUTINE

DIAGNOSTICS ROUTINE

GAS FLOW RATE MEASUREMENT APPARATUS AND METHOD

BACKGROUND OF THE INVENTION

1. Field of the Invention

The present invention relates to apparatus and methods for the measurement of gas flow rate. More specifically, it relates to apparatus and methods which are appropriate for obtaining standardized or otherwise normalized gas flow rate measurements.

2. Description of the Related Art

Applications for apparatus and methods useful in measuring the flow rate of a gas are numerous and widespread. The chemical processing industries would be incapable of producing many products without the ability to accurately measure gas flow rate. As technologies and technological capabilities have advanced and requirements have become ever more exacting, the demands for gas flow rate measurement apparatus and methods with increased speed and accuracy have grown.

As an example of applications with increased technical sensitivity and demands, one may consider recent attempts to further lower emissions from automobiles, trucks and the like, i.e., within the automotive industry. Under the Clean Air Act of 1990, automobile manufacturers must produce vehicles with cleaner burning engines. In order to develop engines with reduced emissions, automobile manufacturers have required a measurement apparatus and method to measure the vehicle exhaust emissions. In addition, certain certification agencies have had a requirement for a measurement apparatus and method to measure the vehicle exhaust emissions in order to certify that a particular vehicle indeed meets the legislative requirements.

The approach usually used to measure the exhaust emissions from a vehicle involves measuring the exhaust flow rate, and performing a chemical speciation analysis of the exhaust gas to identify its chemical components and their respective concentrations. This information then can be used in known manner to determine the amount of particular constituents in the exhaust emissions. The present invention in this application is quite suitable for performing the former function, i.e., quickly and accurately determining the gas flow rate for the exhaust gases, including normalizing that measured flow rate using one or more state variables for the gas, such as temperature and/or pressure.

Publicly known apparatus and methods for measuring gas flow rate typically use indirect methods of measurement. In a system publicly known as the "constant volume sampling" ("CVS") system, for example, the gas flow rate is measured by diluting the incoming gas with a diluent gas, usually ambient air. Such systems typically use either a critical flow venturi or positive displacement pump to undertake the measurement. The flow rate of the diluted mixture is then measured and calculations are performed to determine the exhaust flow rate.

Systems such as the CVS system described here have been disadvantageous, for example, in that the use of dilution air and the corresponding calculations necessitated by this approach introduce errors into the measurement which limit the accuracy and usefulness of the system and method for practical modern exhaust emissions measurement. Approaches such as that used in the CVS system also are limited in that they are relatively slow and cumbersome as an inherent consequence of their design.

OBJECTS OF THE INVENTION

Accordingly, an object of the present invention is to provide a gas flow rate measurement apparatus and method which provide increased measurement sensitivity and increased response time relative to known systems and methods.

Another object of the invention is to provide gas flow rate measurement apparatus and methods which are relatively simpler in design and operation than known systems and methods.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a gas flow rate measurement apparatus is provided for obtaining a normalized flow rate of a gas having at least one liquid component. The gas travels from an upstream position and in a downstream direction. The gas flow rate measurement apparatus comprises a gas inlet conduit in the upstream position for receiving the gas; a gas flow conditioning section in fluid communication with the gas inlet conduit and in a first downstream position for conditioning the gas to vaporize substantially all of the at least one liquid component without adding any other gas; a flow rate measurement section in fluid communication with the gas flow conditioning section and in a second downstream position more distant from the upstream position than the first downstream position, the flow rate measurement section including at least one sensor for sensing at least one state variable for the gas and generating at least one gas state signal, and a flow rate sensor for measuring an actual flow rate of the gas and generating a flow rate signal, and a processing device operatively coupled to the flow rate measurement section for using the at least one gas state signal and the flow rate signal to obtain the normalized mass flow rate.

The gas inlet conduit may include a coupler for coupling to an exhaust of an internal combustion engine in a substantially air tight manner, and it may includes a heat source for inputting heat into the gas.

The gas flow conditioning section may comprise a diverging section for diffusing the gas as the gas flows downstream. It also may comprise a converging section located downstream of the diverging section. The gas flow conditioning section also may comprise a diverging section and a converging section located downstream of the diverging section positioned with respect to one another so that they form a plenum for damping oscillations within the gas. The also may comprise a linear multi-channel flow path, such as a tube bundle. The conditioning section calso may comprise a heat exchanger located downstream of the diverging section for inputting or removing thermal energy into the gas to aid in volatizing the at least one liquid component.

The flow rate measuring section preferably comprises a flow geometry for the gas which does not substantially alter the flow of the gas in the second downstream position. The flow rate sensor may comprise an ultrasound flow measurement sensor, a radial mass flow meter, and other designs as well.

A method is provided for obtaining a normalized flow rate of a gas having at least one liquid component, wherein the gas traveling from an upstream position and in a downstream direction. The method comprises receiving the gas at a gas inlet conduit at the upstream position and channeling the gas to flow in the downstream direction; conditioning the gas at a first downstream position to volatize substantially all of the at least one liquid component without adding any other gas; measuring at least one state variable for the gas and measuring an actual flow rate of the gas at a second downstream position more distant from the upstream position than the first downstream position to generate at least one gas state signal and a flow rate signal, respectively; and using the at least one gas state signal and the flow rate signal to obtain the normalized mass flow rate.

BRIEF DESCRIPTION OF THE DRAWINGS

The accompanying drawings, which are incorporated in and constitute a part of the specification, illustrate a presently preferred embodiment and method of the invention and, together with the general description given above and the detailed description of the preferred embodiment and method given below, serve to explain the principles of the invention.

DETAILED DESCRIPTION OF THE PREFERRED EMBODIMENT AND METHOD

Figure 1:
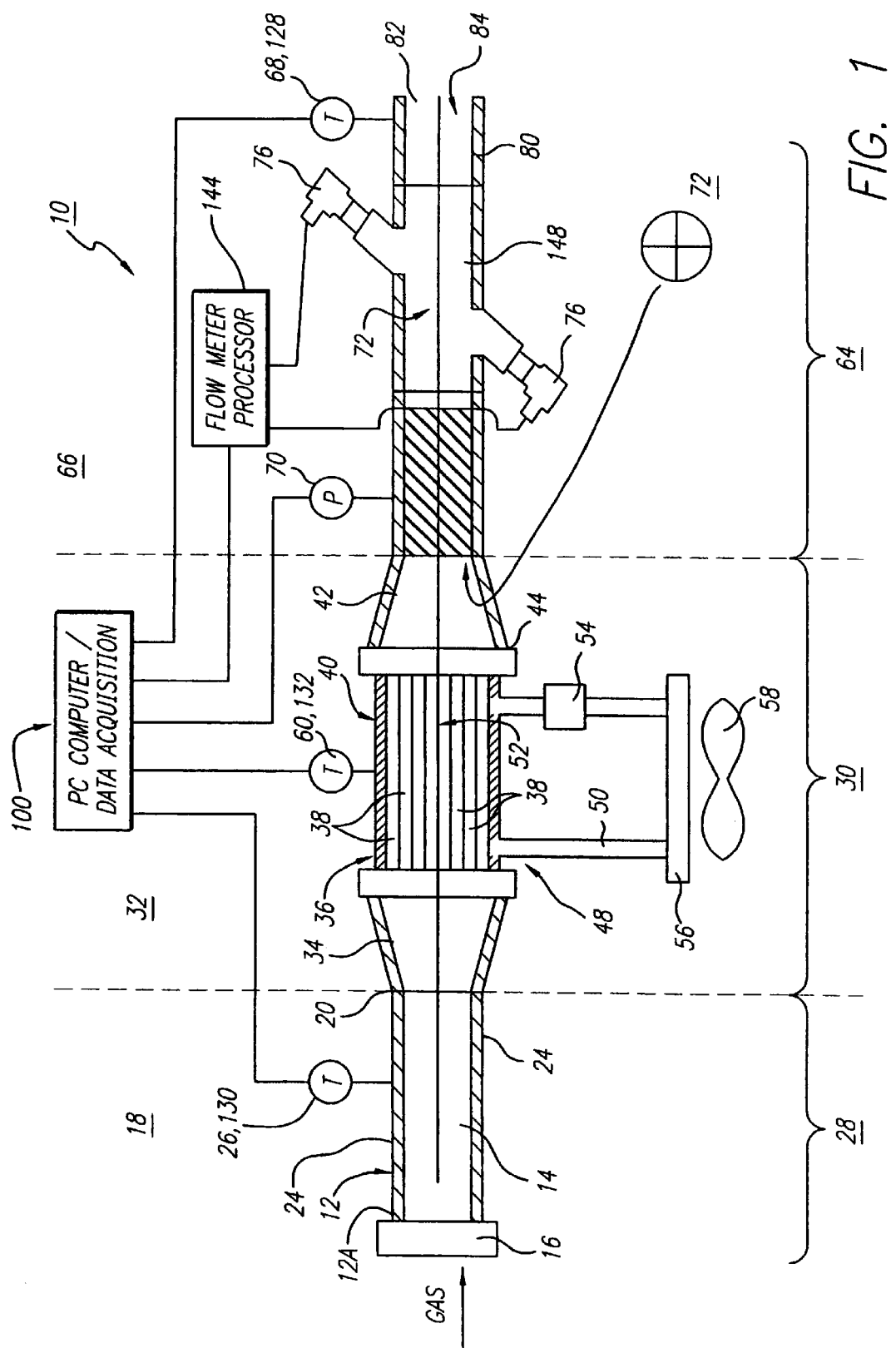
FIG. 1. is a diagram which illustrates a gas flow rate measurement apparatus according to a presently preferred embodiment of the invention, and which is useful for illustrating a presently preferred method according to the invention.

Reference will now be made in detail to the presently preferred embodiment and method of the invention as illustrated in the accompanying drawings, in which like reference characters designate like or corresponding parts throughout the drawings.

In accordance with the invention, a gas flow rate measurement apparatus or system is provided for obtaining a normalized flow rate of a gas having at least one liquid component. The term "gas" as used here is used broadly to include gas-phase compositions, including pure gases, gases which include vapor components, and gases which include solid, liquid, or solid and liquid components in suspension.

Reference to "at least one liquid component" as used herein refers to components in the gase which are liquids or vapors. In the automotive emissions application discussed here, for example, the emission gases from an internal combustion engine typically include small liquid water droplets or suspensions, and/or water vapor. As flow conditions and the state of the gas change, for example, as the gas cools, these liquid components may condense out in bulk. Typically they will be present as an aerosol or liquid droplet suspension in the gas phase. In many gas flow rate applications it is desirable to ensure that essentially all of the liquid or volatile components are in the gaseous or vapor state during the gas mass flow rate measurements. The presently preferred system is well-suited to accomplish this. Gas flow rate must, of course, by definition include the flow or movement of the gas. For ease of explanation and illustration, it is useful to have a reference frame to describe the flow or movement of the gas, and to envision the relative positions or spatial relations of system components. Accordingly, the gas in the illustrative discussions below will be assumed to be traveling from an upstream position and in a downstream direction. The upstream position as the phrase is used herein is used in a general sense to refer to a general upstream location as will be explained in greater detail below, and the downstream direction or "downstream" refers to positions displaced in the direction of flow or movement of the gas, also as explained more fully below.

To illustrate the principles of the invention, a gas flow rate measurement apparatus or system 10 according to a presently preferred embodiment of the invention is shown in FIG. 1, to which we will now refer. System 10 is adapted to, and is particularly suitable for, use in directly measuring the gas flow rate of vehicle exhaust emissions as they emanate from the exhaust of an internal combustion engine of a conventional automobile or truck engine. Such a system is useful in a research setting, for example, to directly and accurately measure vehicle exhaust emissions to monitor compliance with emissions standards. This application, however, is merely representative of the myriad of applications in which the invention may advantageously be employed.

In accordance with one aspect of the invention, the gas flow rate measurement apparatus includes a gas inlet section which includes a gas inlet conduit in the upstream position for receiving the gas. In a broad sense, the gas inlet conduit may be any flow characterizing or channeling means which receives the gas, or by which the gas flows, and which in essence serves the role of introducing the gas into the flow regime, channel or gas flow path along which other components of the system are disposed.

As embodied in gas flow measurement system 10, a gas inlet conduit 12 is provided which comprises a substantially-cylindrical pipe 14 approximately equal in diameter or cross section to a vehicle exhaust pipe (not shown). The diameter of inlet conduit 12, for example, might range from about 2.5 inches to about 6 inches, and preferably about 3 inches. Because inlet conduit 12 in this illustrative system is adapted to be coupled directly to the exhaust of an internal combustion engine such as engines that might be used in conventional automobiles or trucks, gas inlet conduit 12 according to this preferred embodiment includes a coupler 16 for coupling the upstream end 12a of inlet conduit 12 to the exhaust of the internal combustion engine in a substantially air tight manner. Although as a practical matter a perfectly air tight coupling may not be practicable, coupler 16 is designed to minimize leakage of gas exhausted from the engine so that essentially all of the gas emanating from the engine, or the exhaust conduit of it, which corresponds to the gas flow to be measured, is introduced into system 10.

Gas inlet conduit 12 is located in an upstream position 18 (form dashed line leftward), which generally corresponds to the region along conduit 12 extending from coupler 16 to a downstream end 20 of inlet conduit 12. Gas inlet conduit 12 of this embodiment measures approximately 18 inches in length from coupler 16 to downstream end 20 of inlet conduit 12.

In some applications, such as the automotive emissions application for which the preferred embodiment is adapted, it is desirable to ensure that some or all of the liquid or volatile components of the gas (referred to herein as "liquid" components) are in the gaseous state or phase, as opposed to the bulk liquid or liquid suspension state or phase. Although a number of techniques may be used to achieve this gaseous state, a preferred approach involves heating the gas to aid in volatizing or vaporizing these liquid components. Accordingly, gas inlet conduit 12 also includes a heat source for inputting heat into the gas. In this preferred embodiment, the heat source comprises a heat blanket 24 disposed about conduit 12 so that when heated, thermal energy is inputted through conduit 12 and into the gas contained within conduit 12. It will be appreciated that other heat sources may be used. Examples of such alternate heat sources might include, for example, heat exchangers of various types, heat sources integrally incorporated into the conduit, etc.

In this embodiment, a temperature sensor 26 is disposed in inlet conduit 12 for measuring the temperature of the incoming gas as it is received by system 10.

The gas inlet section 28 of system 10 includes all of the components between coupler 16 and downstream end 20. It will be noted that at no portion of gas inlet 28 section is outside air or gas introduced into the section, other than perhaps trace influx from unavoidable leakage.

Further in accordance with the invention, the gas flow rate measurement system includes a gas flow conditioning section in fluid communication with the gas inlet conduit and in a first downstream position for conditioning the gas to vaporize substantially all of the at least one liquid component without adding any other gas. The reasons for including a gas flow conditioning section include conditioning the flow of the gas so that it is has as straight and uniform a flow profile flow as practicable. The gas flow conditioning section also may be used to further ensure that the liquid components of the gas have been placed in the vapor or gaseous state. The gas flow conditioning section also may be used to control the state, and particularly the temperature, of the gas so that it is most amenable to measurement in subsequent portions of the system and does not interfere with or damage such downstream components.

The "first downstream position" as referred to here means a general region or section of the flow regime or channel which is in fluid communication with upstream position or region 18, for example, at downstream end 20 of gas inlet conduit 12, and which extends to the gas flow measurement section as described more fully below.

The gas flow conditioning section conditions the gas to vaporize substantially all of the at least one liquid component, and it does this without adding any other gas. The temperature of the gas is raised sufficiently so that it exceeds the dew point of any liquids or volatile components in the gas. This ensures that essentially all components of the gas are in the gas phase. Note that this approach differs fundamentally from prior approaches wherein vaporization of volatile components is achieved by diluting the vapor to lower its vapor pressure or partial pressure.

Although in a practical sense it may be difficult or impractical to completely prevent the introduction of additional gases into the gas flow, and trace amounts would not significantly affect or change the principles of operation, system 10 does not add a diluent gas as is done in known systems such as the CVS systems. This does not necessarily preclude the creation of gases within system 10 from reactions which may be occurring in system 10 from chemical constituents introduced into the system as part of the inlet gas, which in the preferred embodiment is the inlet exhaust gas from the internal combustion engine. The specific intent in system 10 is to eliminate the addition of any other gas, to the extent practicable. This approach has a number of significant implications which highlight advantages of the invention over prior known systems and methods. For example, the absence of air or other gases as a diluent or other additive to the gas flow to be measured means that the natural flow rate of the gas to be measured need not be changed significantly to perform flow rate measurements. It also means that the gas to be measured is more responsive to changes in temperature, and typically to changes in such gas state variables as pressure.

Turning more specifically to the preferred embodiment, system 10 includes a gas flow conditioning section 30 in fluid communication with gas inlet conduit 12 and in a first downstream position 31 (between the dashed lines) for conditioning the gas to vaporize substantially all of the at least one liquid component without adding any other gas.

As noted above, first downstream position 32 refers generally to the region beginning in the upstream direction at downstream end 20 of inlet conduit 12 and extending to the beginning of the gas flow measurement section (described below). In this embodiment, gas flow conditioning section 30 is about 30 inches in length running from upstream to downstream or vice versa.

Gas flow conditioning section 30 comprises a diverging section which in this case includes a diffuser 34 for diffusing the gas as the gas flows downstream. This diverging section is included to decelerate the flow in such a manner so as to minimize the pressure loss while preparing the flow to enter the heat exchanger/plenum section.

Diffuser 34 is designed with an internal geometry so that there is a minimum of flow separation as the gas proceeds in the downstream direction. In this embodiment diffuser 34 is approximately 6 inches long.

A central conduit 36 is contiguous with and in fluid communication with diffuser 34. Central conduit 36 has an outside diameter of about 12 inches, and an effective inside diameter of about 11.5 inches.

Gas flow conditioning section 30 also includes a linear multi-channel flow path. As embodied here, this comprises a plurality of tubes 38 to from a tube bundle 40 disposed longitudinally within the interior of central conduit 36. Each tube 38 is approximately 0.5 inch in diameter, and runs essentially the entire length of central conduit 36. Tubes 38 together with central conduit 36 form what is essentially a shell and tube heat exchanger. As the gas flows downstream in system 10, tubes 38 function to facilitate linear flow as the gas passes from diffuser 34.

Gas flow conditioning section 30 also comprises a converging section or nozzle 42 located downstream of the diverging section. Nozzle 42 is contiguous at its upstream end 44 with central conduit 36. Nozzle 42 has upstream inside and outside diameters which match and mate with those of central conduit 36.

In this particular embodiment, as noted, gas flow conditioning section 30 includes both a diverging section for diffusing the gas as the gas flows downstream and a converging section located downstream of the diverging section. The diverging section and the converging section are positioned with respect to one another so that they form a plenum for damping oscillations within the gas. In this specific embodiment, the overall length of gas flow conditioning section 30 is about 30 inches. The plenum chamber formed by diffuser 34, central conduit 36, and nozzle 42 is quite effective at damping vibrational modes as are experienced from the discharge of a reciprocating internal combustion engine.

Gas flow conditioning section 30 preferably includes a heat exchanging means such as a heat exchanger 48 located downstream of diffuser 34 for inputting thermal energy into the gas to aid in volatizing at least one liquid component, or for removing heat from the gas, or both. Removal of heat from the gas might be appropriate, for example, to contain the gas temperature below a maximum temperature tolerable by the flow rate sensor, which is described below.

It has been noted that central conduit 36 and tube bundle 40 contained therein form in essence a shell and tube heat exchanger. Heat exchanger 48 comprises a flow loop 50 in fluid communication with shell and tube portion 52 of heat exchanger 48 formed by central conduit (shell) 36 and tube bundle 40. A resistive heating element 54 is disposed in or about a portion of fluid loop 50 for selectively heating the gas in tube bundle 40 as it passes through central conduit 36. Heat exchanger 48 also includes an air cooled heat exchanger or radiator 56 in loop 50, and a fan 58 is disposed adjacent to air-cooled heat exchanger or radiator 56, for effecting cooling of the gas as it passes through central conduit 36 and tube bundle 40. Fan 58 and resistive element 54 are coupled to the computer (described below) for control and switching in a known manner. A temperature sensor 60 essentially identical in design to temperature sensor 26 is disposed in central conduit 36 Other heat exchanger designs may be used in addition to or as an alternative to the design specifically described herein. A heat blanket, for example, could extend onto or around the exterior of central conduit 36.

In accordance with the invention, the gas flow rate measurement system further includes a flow rate measurement section in fluid communication with the gas flow conditioning section and in a second downstream position more distant from the upstream position than the first downstream position. The flow rate measurement section includes at least one sensor for sensing at least one state variable for the gas and generating at least one gas state signal, and a flow rate sensor for measuring an actual flow rate of the gas and generating a flow rate signal.

The gas flow rate measurement section performs the functions of directly measuring the flow rate, typically but not necessarily the volumetric flow rate, and state variables for the gas used in normalizing the flow rate and reducing it to a mass flow rate. This is accomplished without adding any gases such as dilutent gases, subject to the limitations noted above.

State variables for the gas as the term is used here refers to any one of the variables used in describing the physical state of the gas. The variables in a chemical equation of state for a gas would be examples. The ideal gas law provides an illustrative example. According to the ideal gas law, $PV=nRT$, where P=pressure, V=volume, n=concentration, R=the ideal gas constant, and T=temperature. In an ideal sense, each of these variables can change or vary, although the value of R is essentially constant over wide ranges. Therefore, any one of the variables P, V, n or T, and in some instances R, may be a state variable.

As implemented in the preferred embodiment, gas flow rate measurement section 64 of system 10 is located in a second downstream position 66 (from the line rightward in FIG. 1). Gas flow rate measurement section 64 includes a temperature sensor 68 for measuring temperature of the gas (a gas state variable) in section 64. Temperature sensor 68 in practice may comprise any of a number of different sensors, including commercially-available sensors. Ideally the specific sensor used for temperature sensor 68 is selected so that it causes a minimum of impairment to flow of the gas, and therefore minimizes the pressure drop across this section.

Accuracy of the sensor itself of course is an important consideration in its selection. Depending upon the specific application, it may be necessary to select a temperature sensor primarily based upon accuracy or sensitivity over the temperature range or ranges in question.

The response time of the temperature sensor is critical to maintain system accuracy in a system with quickly changing temperatures. In the preferred embodiment and method a response time constant of at most about 2 seconds in moving air is required to maintain overall system accuracy.

The response time of the temperature sensor also can play an important role in its selection. The accuracy of the flow rate measurement typically will depend upon the accuracy of the gas state variable measurements. Particularly where real-time or near-real-time measurements are required, the response time of the sensors can be a limiting factor.

Returning to the emissions measurement application of the preferred embodiment, temperature sensor 68 comprises an RTD device, for example, such as those commercially available for use in the chemical process industries for pipe flow temperature measurement. The output of temperature sensor 68 is an electrical resistance which is representative of the temperature of the gas as it flows past the sensor. The output of RTD is a nominal 100 Ω at 0° C and 280.9 Ω at 500° C. Temperature sensor 68 is coupled at its output to a current transmitter device such as a Burr Brown XTR103 current transmitter, commercially available from Burrbrown Corporation, Tucson, Ariz., with associated circuitry. The XTR103 current transmitter includes RTD excitation linearization to improve the performance of the temperature measurement components.

Measurement section 64 also includes a gas state sensor in the form of a pressure sensor 70. Pressure sensor 70 may be of a variety of types and brands suitable for measuring pressure of the flowing gas with a minimum of pressure drop and thus non-intrusively. There are a number of commercially-available pressure sensors that would be suitable, as would be readily understood by those of ordinary skill in the applicable art.

Gas flow rate measuring section 64 also comprises a flow geometry for the gas which does not substantially alter the flow of the gas in second downstream position 66. After nozzle 42 a straightener vane 72 is used to divide the flow pattern into four essentially equal-sized and shaped flow conduits to eliminate swirl and to further linearize the flow.

Measurement section 64 also includes a flow rate sensor 76 which preferably comprises an ultrasound flow measurement sensor. Examples of flow meters of this type would include a UGF5 ultrasonic gas flowmeter, commercially-available from EG&G Instruments Flow Technology, Phoenix, Ariz. Other examples of suitable flowmeters would include the Panametrics Model GP68 Transit-Time Flowmeter for Gas, commercially-available from Panametrics, Inc., Waltham, Mass., and the Kaijo GF-500 Series ultrasonic gas flow-meter, commercially-available from Kaijo Corporation, Tokyo, Japan.

Flow rate sensor 76 also may comprise a radial mass flow meter. An example of this type of flow meters would include the Direct Measurement Corp. radial mode Coriolis mass flowmeter, commercially-offered by Direct Measurement Corp. of Denver, Colo., a division of FMC Corp.

Ideally the temperature, pressure and flow rate sensors wouldn't impede or obstruct the flow significantly more than the pressure drop of an equivalent length of pipe with the same diameter as the main flow path at the gas inlet and flow rate measurement section 64.

For all of the meters and components of gas flow measurement section 64 and the other sections as well, it is preferable in most applications to select the components and incorporate them into the system so that impairment to flow and corresponding pressure drop is minimized. This can be done, for example, by maintaining constant geometry on the flow geometry, using non-obstructive and non-intrusive meter designs, etc.

When system 10 is used to measure the exhaust flow rate of an internal combustion engine, it must not produce a significant back pressure so as not to alter the performance of the section of the flow rate measurement process.

A gas outlet conduit 80 is provided at the extreme downstream end 82 of gas flow rate measurement section 64. Outlet conduit 80 has a diameter essentially identical to that of the other flow regime portions of gas flow rate measurement section 64. An exhaust opening 84 at the end of outlet conduit 80 is open to ambient air and conditions.

Figure 2:
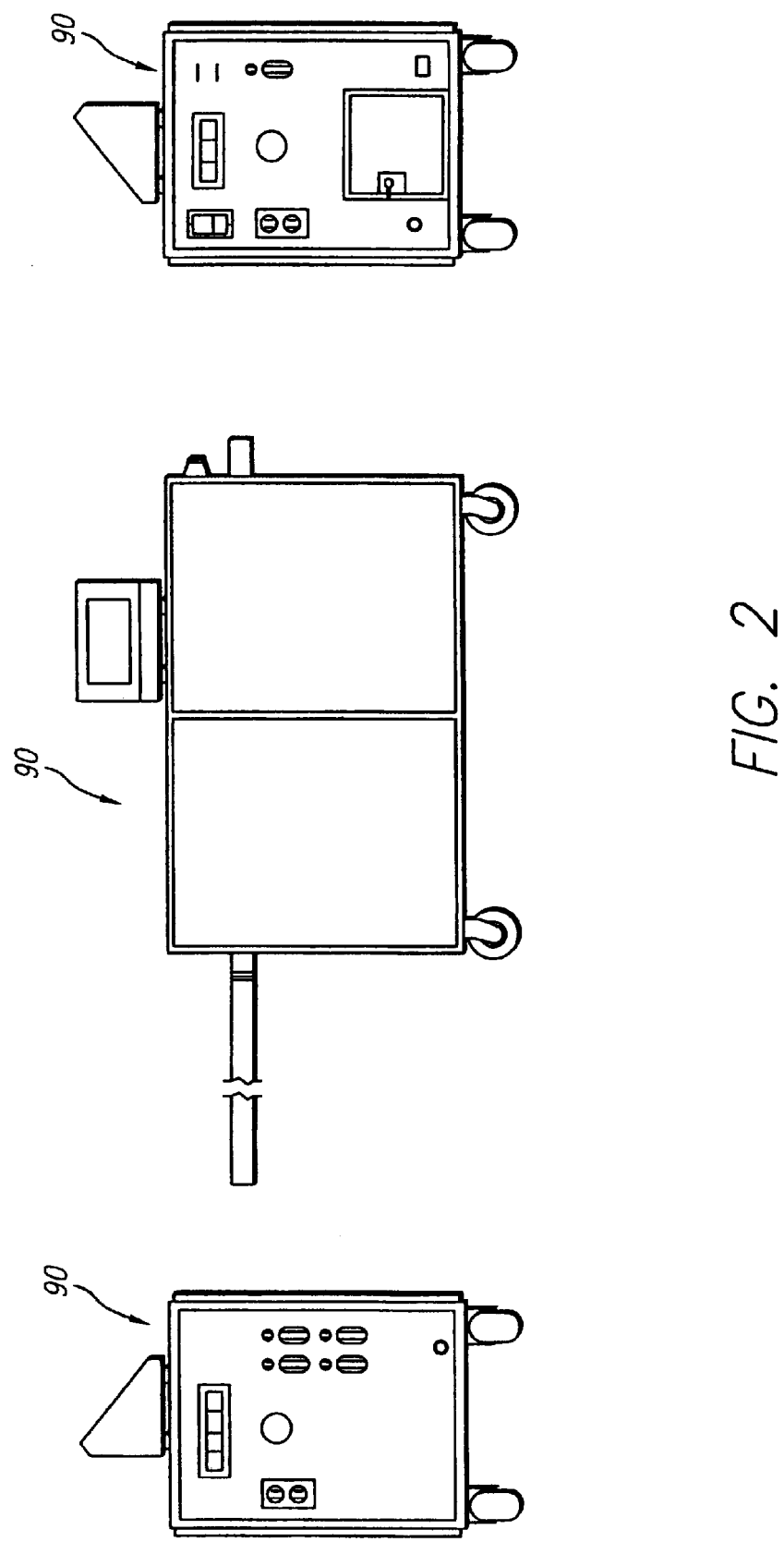
FIG. 2 is a diagram which illustrates a movable cabinet into which the gas flow rate measurement apparatus of FIG. 1 has been incorporated.
Figure 3:
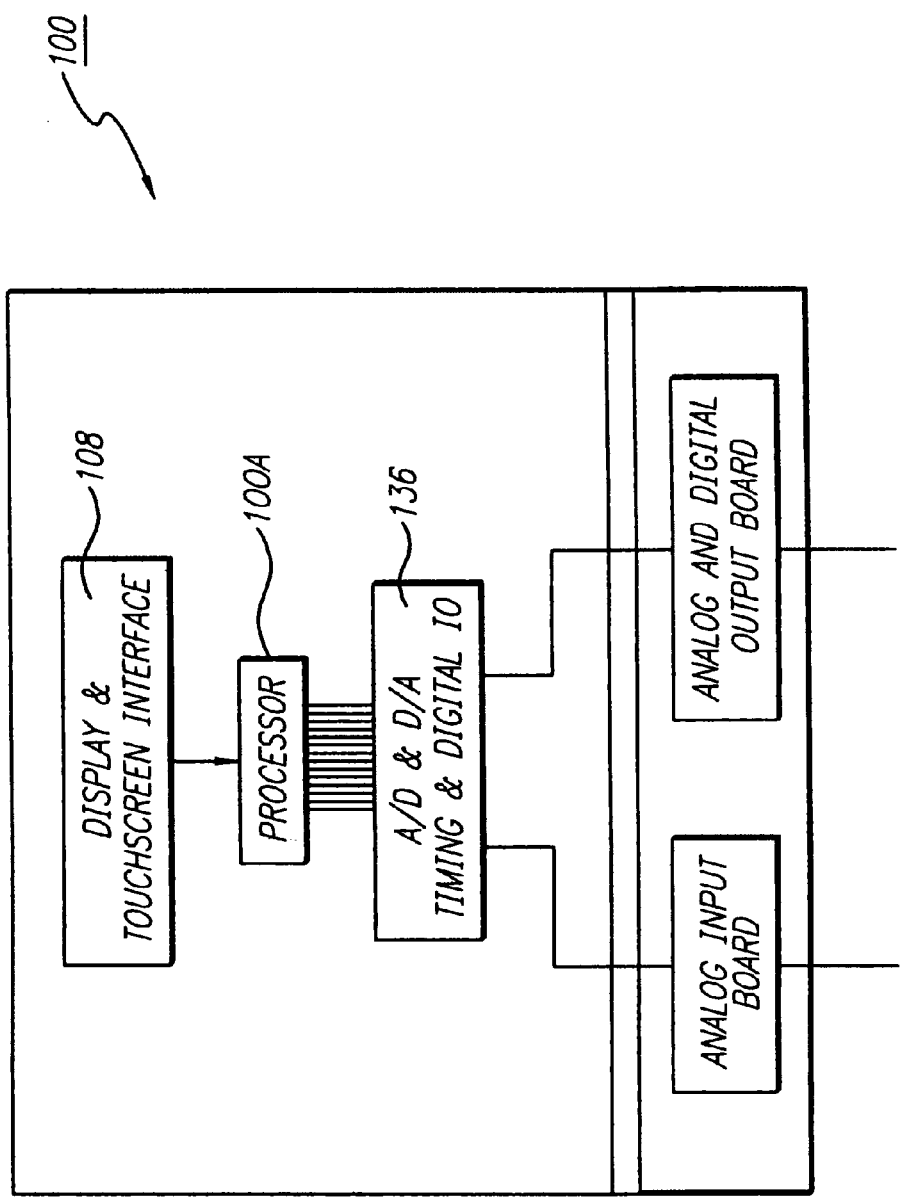
FIG. 3 is block diagram of a computer and input/output circuitry used according to the presently preferred embodiment and method of the invention.

System 10 as thus far described, i.e, sections 28, 30 and 64, are contained within a cabinet 90 as shown in FIG. 2. In accordance with the invention, the gas flow rate measurement system also includes a processing device operatively coupled to the flow rate measurement section for using the at least one gas state signal and the flow rate signal to obtain the normalized flow rate. In this embodiment, the processing device comprises a PC-type computer system 100 which uses an Intel-based microprocessor, a touch screen and display or monitor as are readily commercially available. As shown in FIG. 3, computer 100 includes an input interface board 102 and an output interface circuitry 104.

Figures 1, 4:
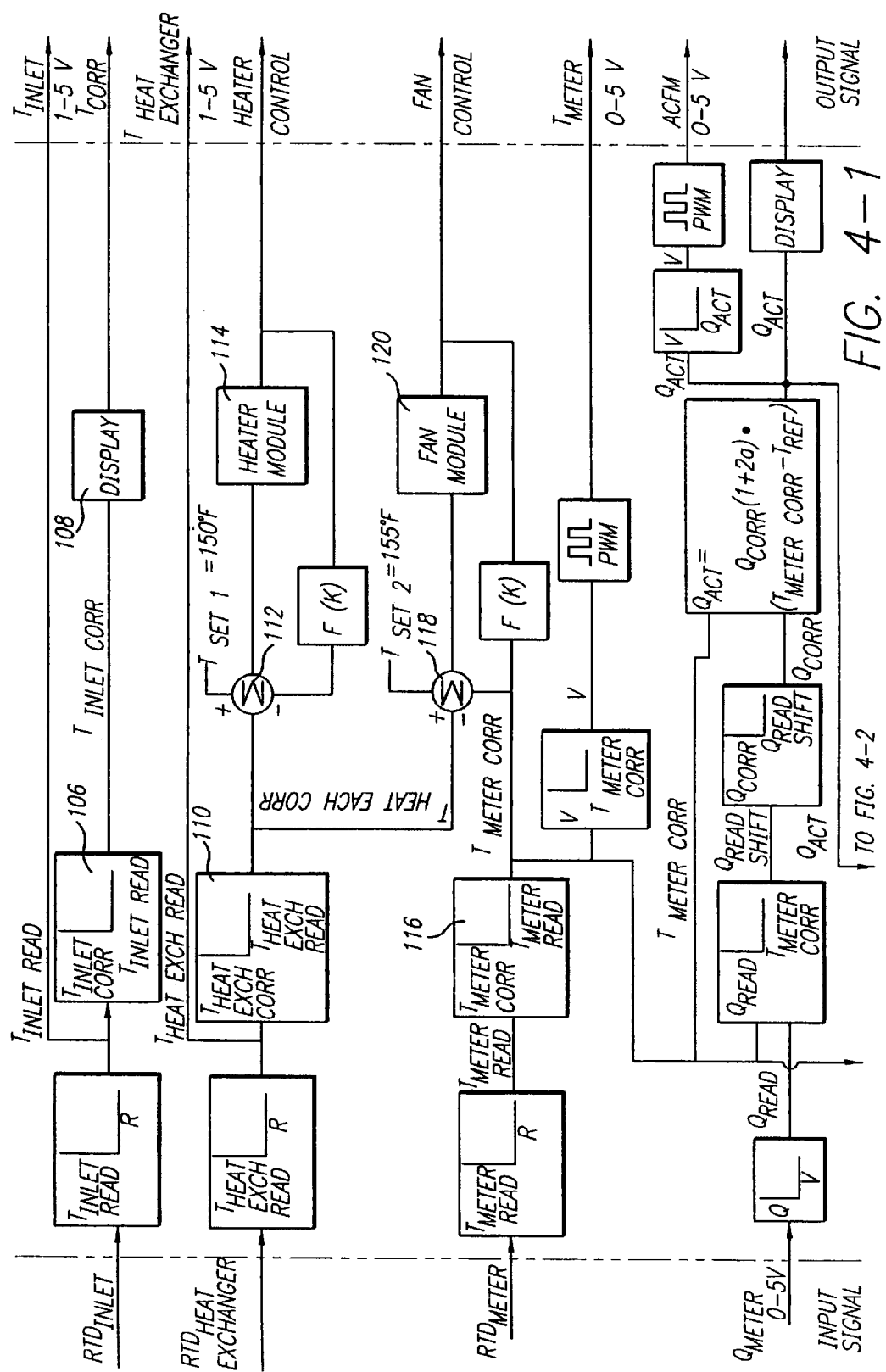
FIG. 4 is a block diagram which illustrates the processing of gas state signals and the flow rate signal performed by the processing device to obtain the mass flow rate according to the preferred embodiment and method of the invention.
Figures 2, 4:
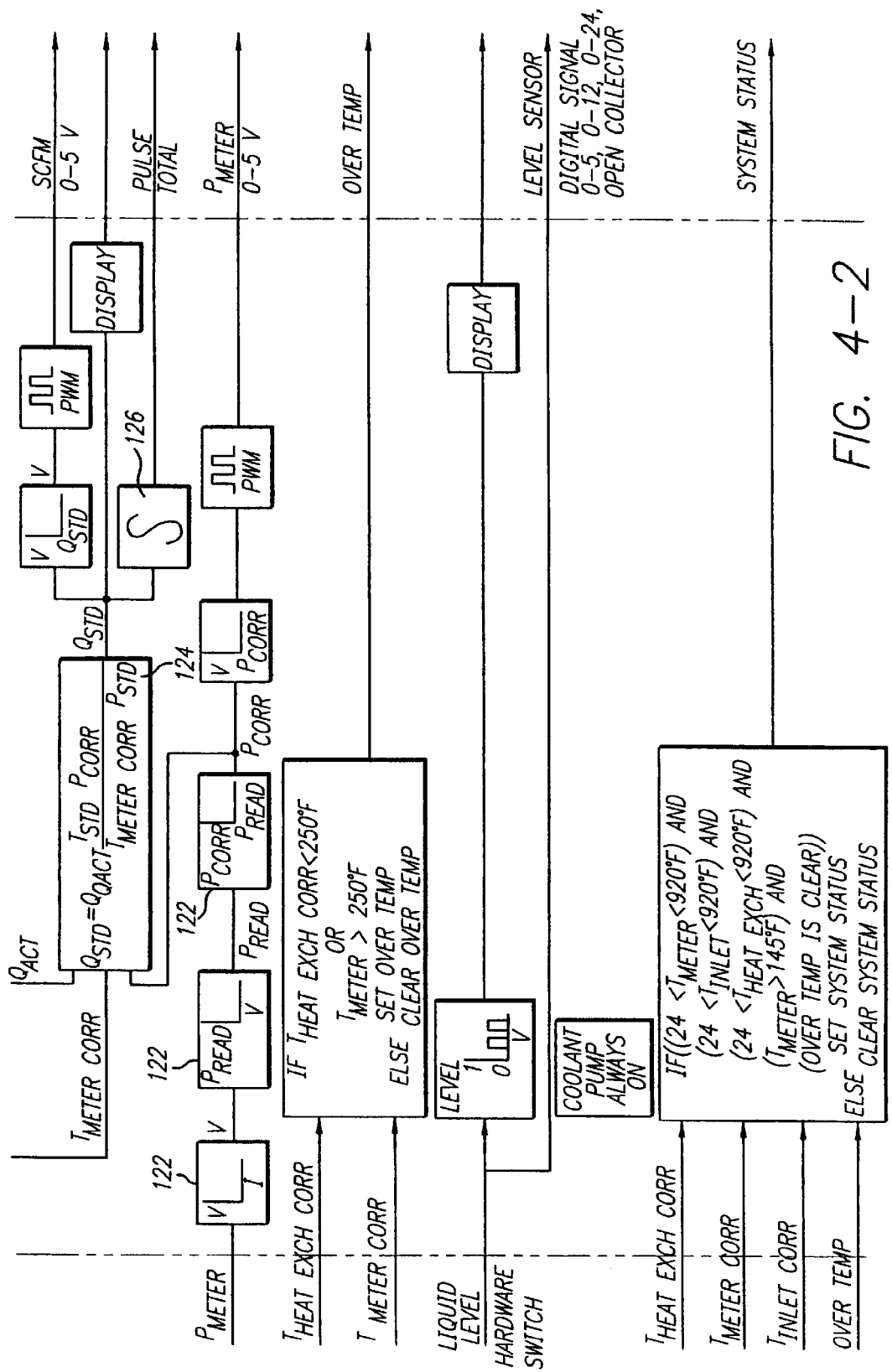

Referring to FIG. 1, each of inlet temperature sensor 26, heat exchange temperature sensor 60, meter temperature sensor 68 and pressure sensor 70 is coupled to computer/ data acquisition system 100. Referring to FIG. 4, inlet temperature sensor 26 provides an inlet temperature signal (RTDinlet) to the input of inlet linearization system 106 to provide correction for measurement errors resulting from nonlinearity of inlet temperature sensor 26 over a relatively wide temperature range. Inlet linearization system 106 is coupled to a display 108 to provide a corrected temperature signal (Tcorr) which may be displayed to a user.

Again referring to FIG. 4, heat exchanger temperature sensor 60 provides a heat exchanger temperature signal (RTD heat exchanger) to the input of a heat exchanger linearization system 110 to provide correction for measurement errors resulting from nonlinearity of the heat exchanger temperature sensor 60 over a relatively wide temperature range. Heat exchanger linearization system 110 is coupled to adder 112 which is coupled to an input of a heater module 114. Heater module 114 output provides a fan control signal to and is coupled to the negative input of adder 112, thereby providing feedback control loop to control the temperature of the gas. Signal Tset1 is also input to adder 112 to provide a set temperatue to which the gas is controlled.

Still referring to FIG. 4, heat exchanger temperature sensor 60 is used to generate a control signal to control heater 54 or heat blanket over section 64 to maintain the temperature of the gas above the dew point. Heat exchanger temperature sensor 60 provides a heat exchanger temperature signal (RTD meter) to the input of a heat exchanger linearization system 110 to provide correction for the measurement errors resulting from nonlinearity of heat exchanger temperature sensor 60 over a relatively wide temperature range. Heat exchanger linearization system 110 is coupled to adder 118 which is coupled to an input of a fan module 120 for fan 58. Fan module 120 provides a fan control signal to and is coupled to the negative input of adder 118, thereby providing feedback control loop to control the temperature of the gas. Corrected meter exchanger temperature signal T meter corr is also input to adder 118 to insure that the gas temperature does not exceed the safe limit of flow meter sensor 76. Signal Tset2 is also input to adder 118 to provide a set temperature to which the gas is controlled.

Again referring to FIG. 4, pressure sensor 70 provides a pressure signal (Pmeter) to the input of a pressure linearization system 122 to provide correction for measurement errors resulting from nonlinearity of pressure sensor 70. Pressure linearization system 122 provides an output signal Pcorr which is used to correct the gas flow to normalized conditions.

Figure 4A:
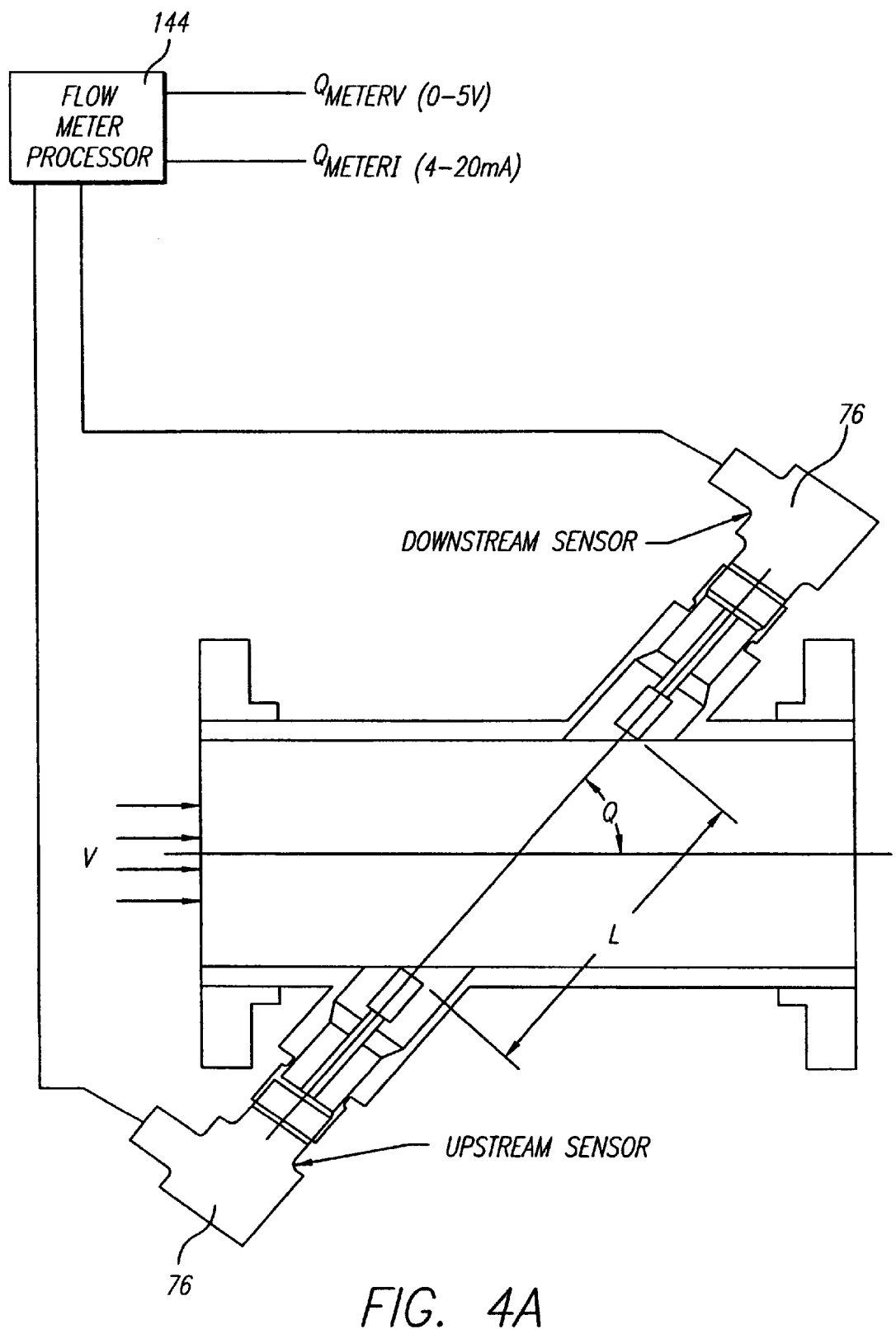
FIG. 4A is a block diagram which illustrates an ultrasound flow measurement sensor used according to the presently preferred embodiment of the invention.

Still referring to FIG. 4 and with reference to FIG. 4A, processor 100 obtains the normalized flow rate as follows. Flow meter 76 provides output signal Qmeter, which is proportional to the mean velocity flow average of 1 to 150 feet per second. Signal Qmeter is coupled to computer 100.

Signals Tmeter corr, Qact, and Pcorr are coupled to normalizer 124, which calculates the normalized gas flow rate by performing the following calculation:

$$Qstd = Qact(Tstd\ Pcorr / Tmeter\ corr\ Pstd)$$

where Qstd=normalized flow rate, Qact=volumetric flow rate, Tstd=normalized meter temperature (specified by user or application designer), and Tmeter corr=corrected meter temperature (from sensor 68). Total mass flow over a given time period t can be calculated by integrating Qstd over time t (see integrator 126).

Figures 1, 5:
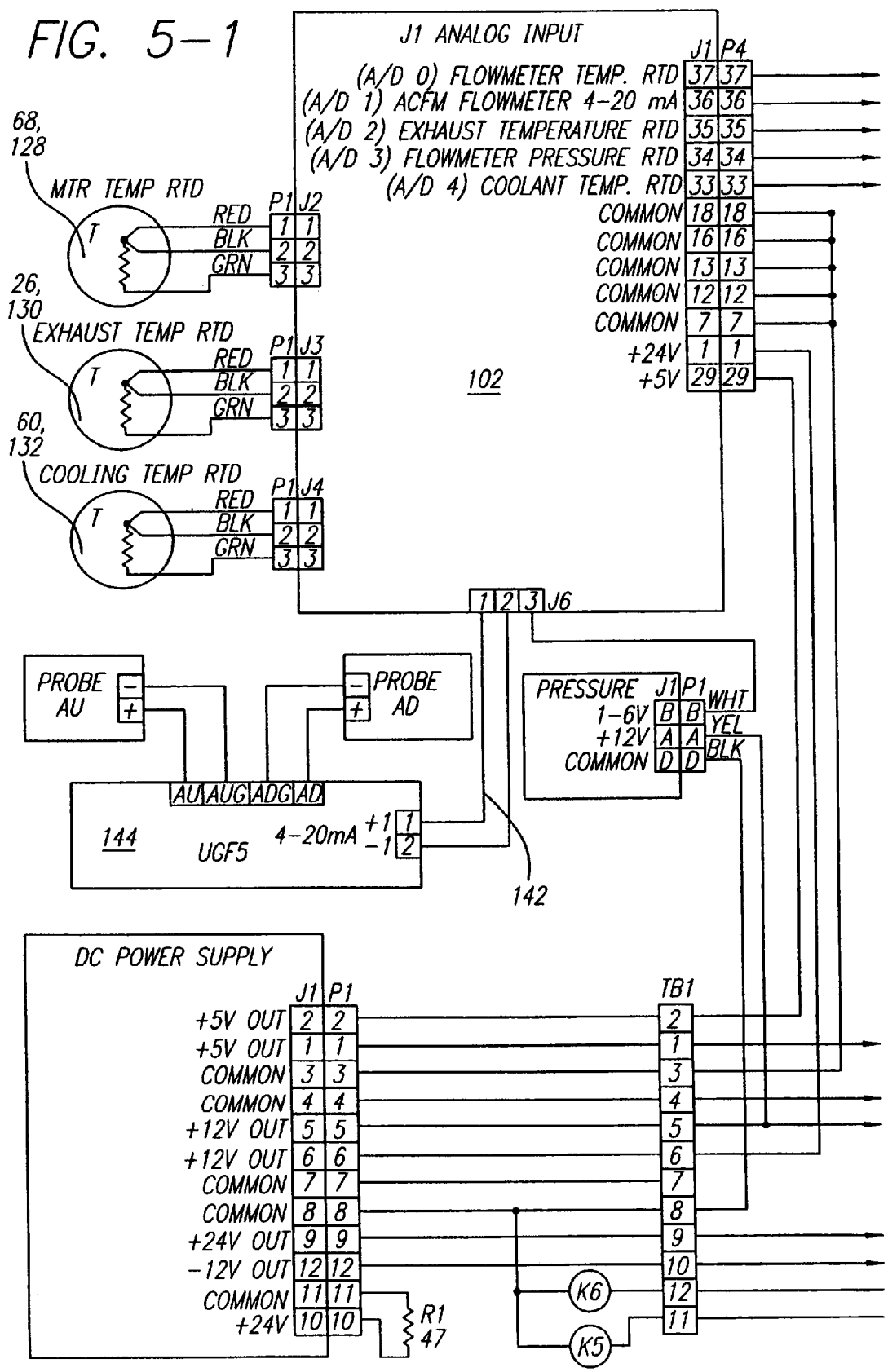
FIG. 5 is a wiring diagram which shows wiring connections between all of the electronic subsystems according to the preferred embodiment and method of the invention.
Figures 2, 5:
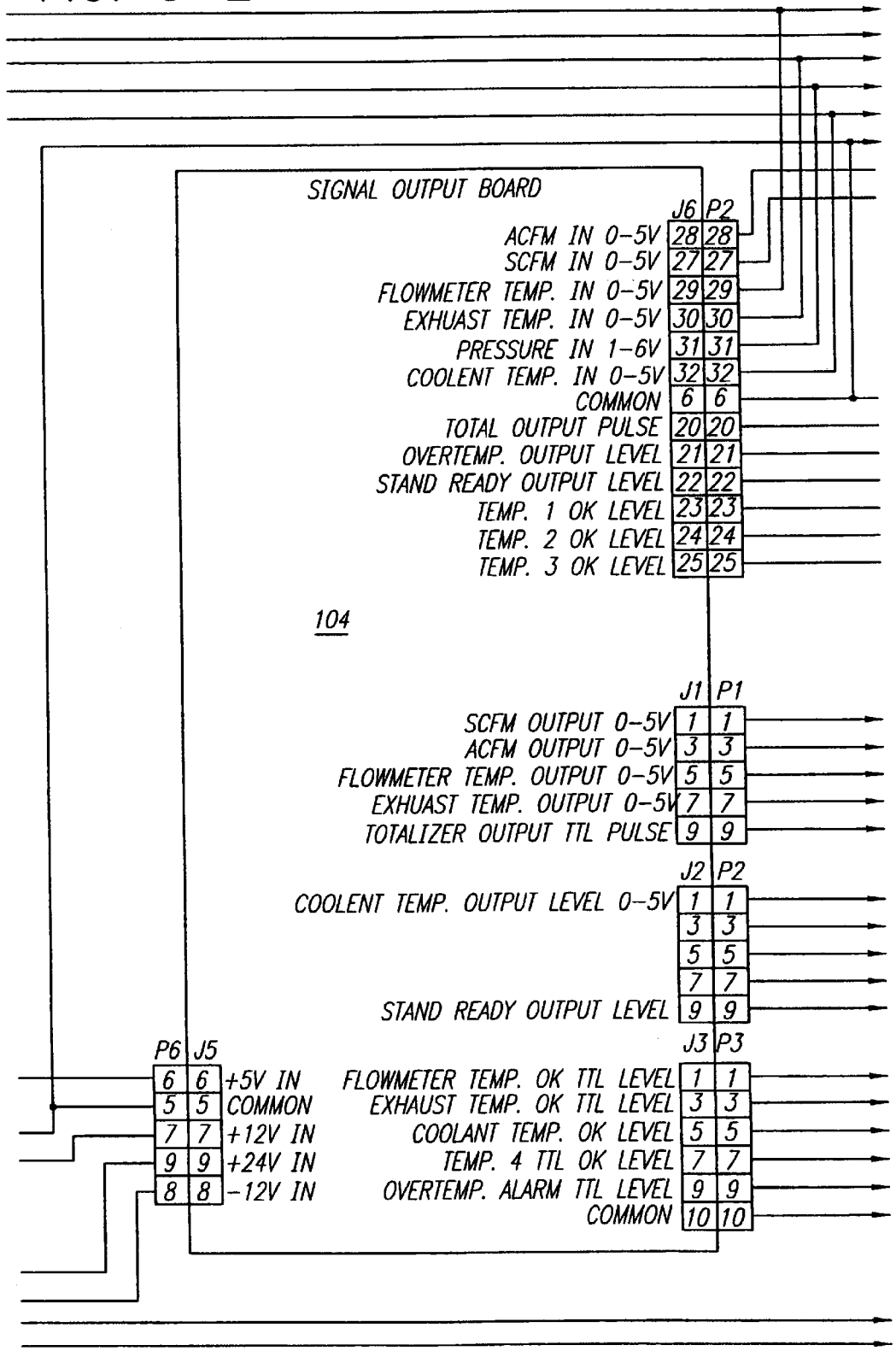
Figures 3, 5:
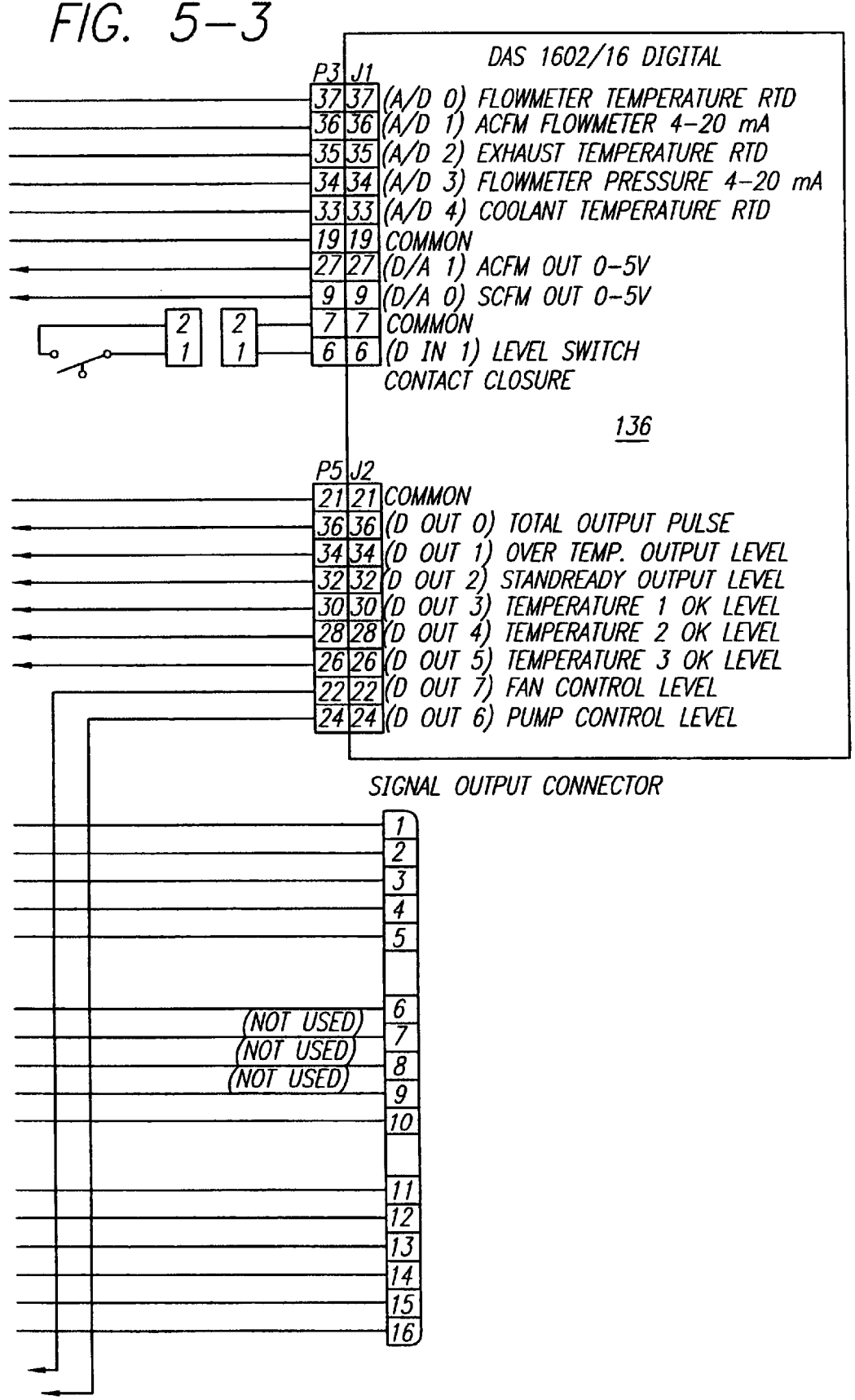
Figures 1, 6:
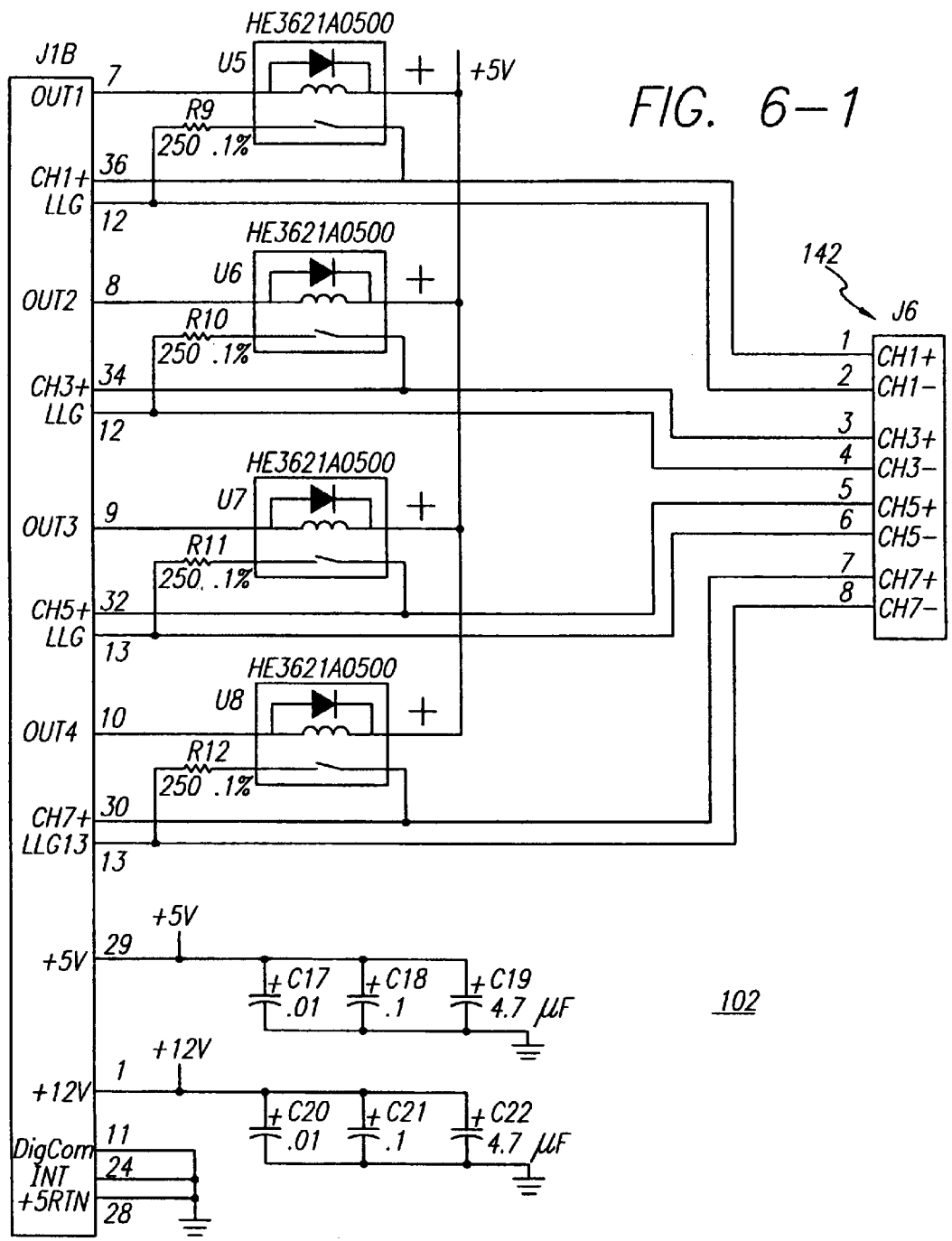
FIG. 6 is a schematic drawing illustrating the temperature sensor linearization circuitry and the current and voltage inputs according to the preferred embodiment and method of the invention.
Figures 2, 6:
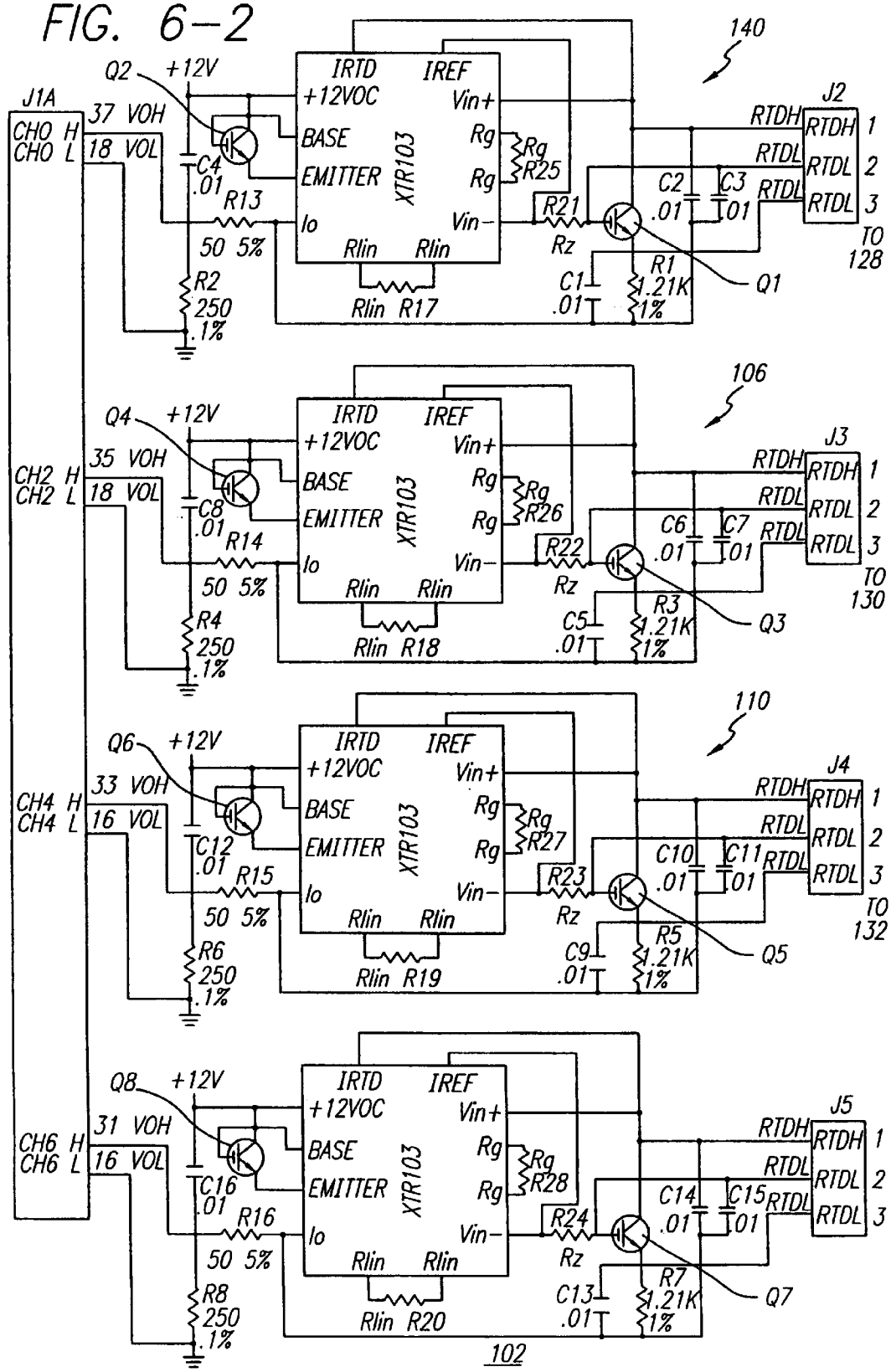
Figures 1, 7:
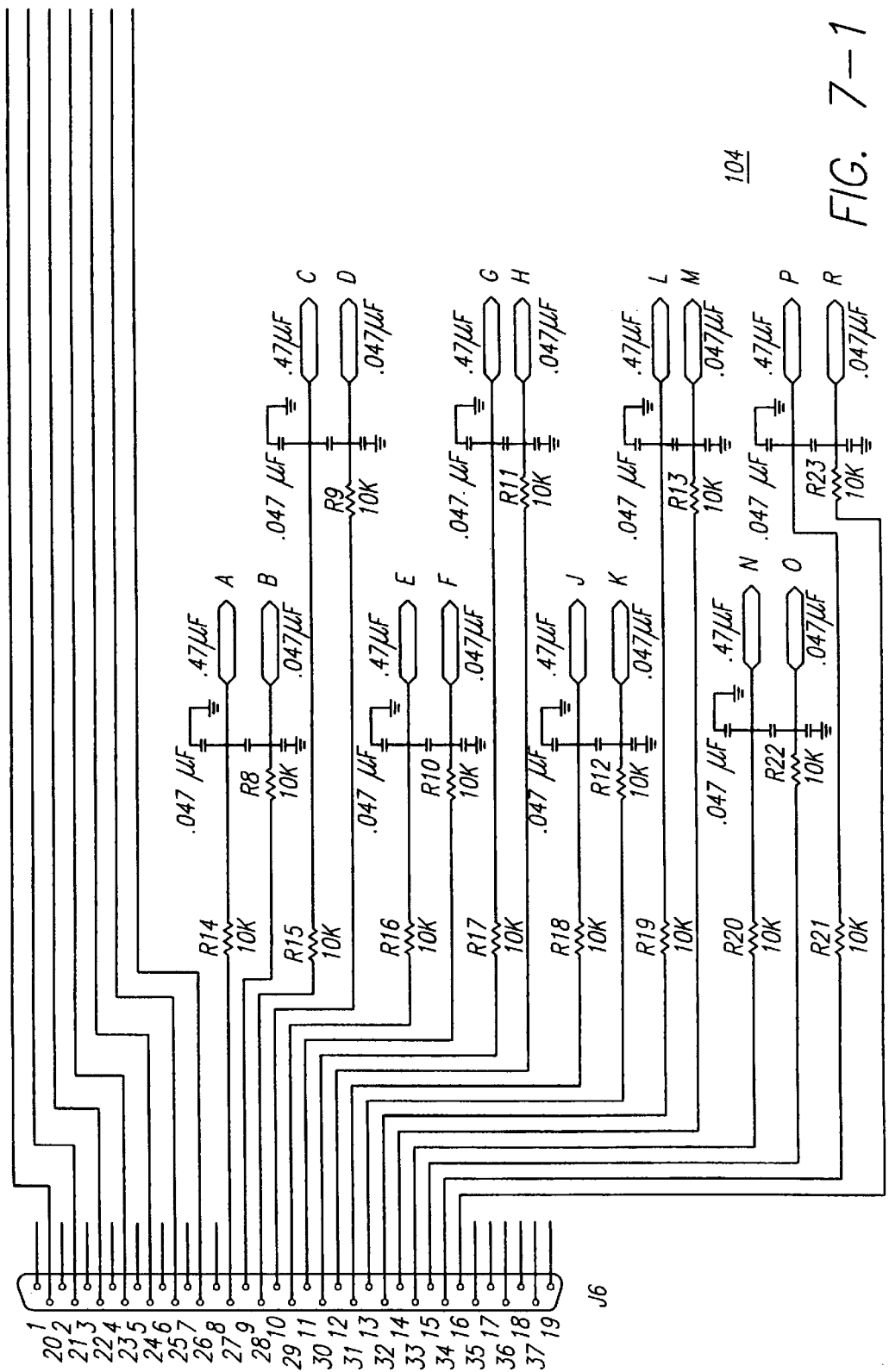
FIG. 7 is a schematic diagram of output buffer circuitry for the output signals showing the board input logic and output logic circuitry according to the preferred embodiment and method of the invention.
Figures 2, 7:
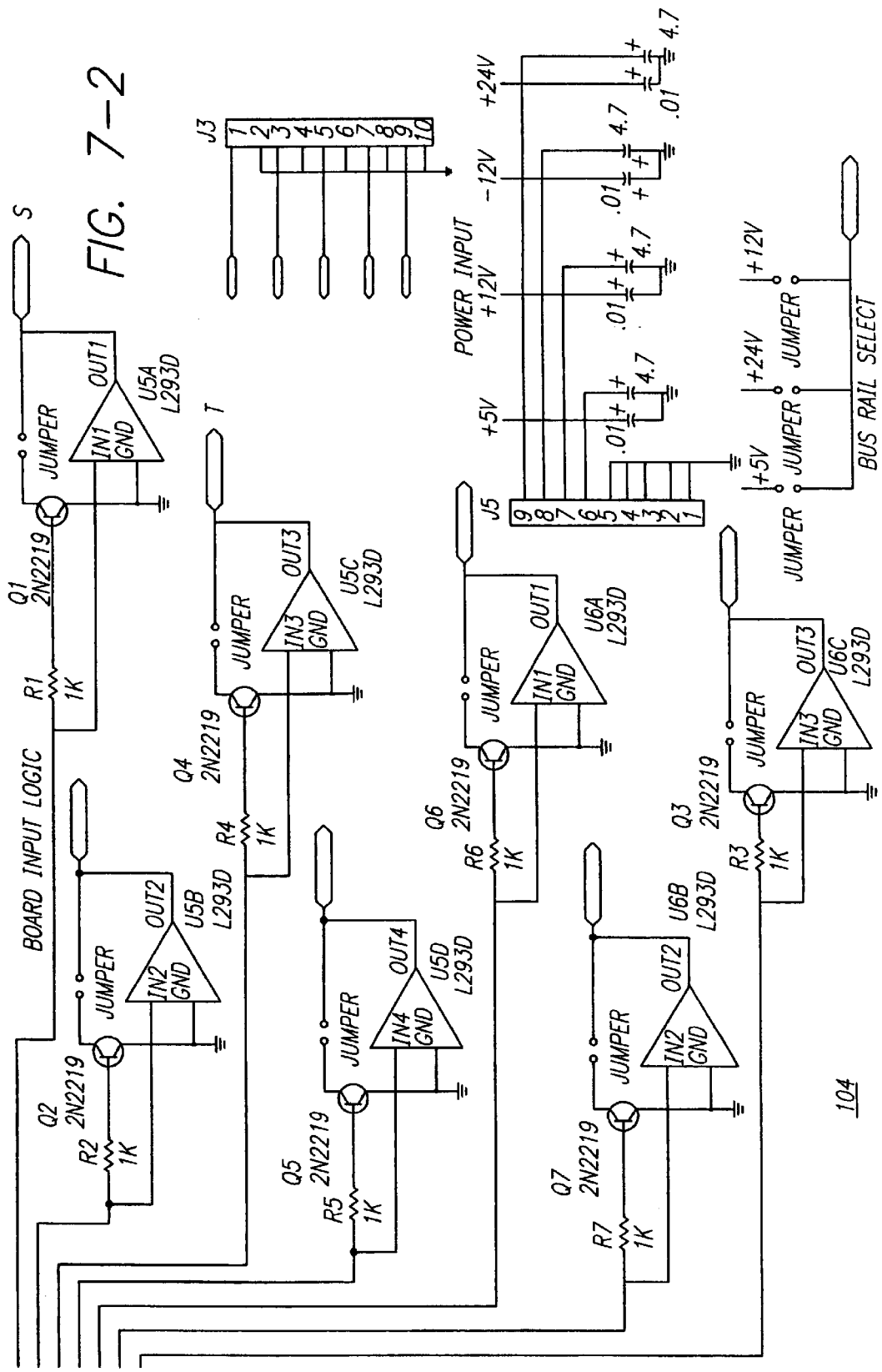
Figure 8:
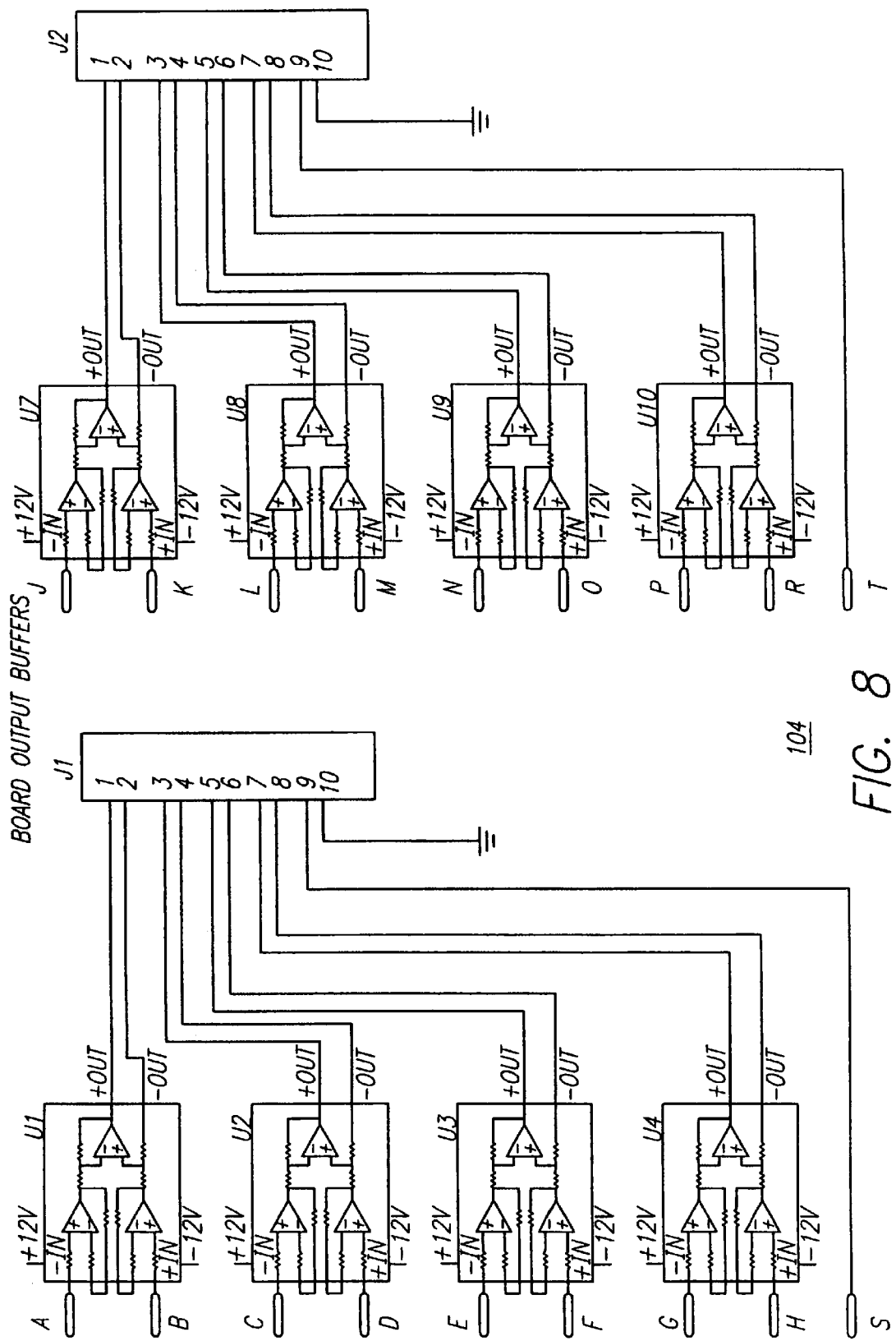
FIG. 8 is a schematic diagram of additional output buffer circuitry showing the board output buffers for analog outputs according to the preferred embodiment and method of the invention.

Referring to FIG. 4 and FIG. 5, in the preferred embodiment, inlet temperature sensor 26, includes a resistive temperature device ("RTD"). The RTD is selected for fast response time and stability. Referring also to FIGS. 5 and 6, each of inlet temperature linearizer 106, heat exchanger temperature linearizer 110, and meter temperature linearizer 116 comprises temperature acquisition board 102 which is used to initially linearize the RTD signal in order to extend the range and accuracy of RTD sensors 128, 130 and 132.

The heat exchanger RTD 132 is coupled to the input of heat exchanger RTD linearization circuit 110 to provide excitation of the heat exchanger RTD and to provide correction to the nonlinearity in the heat exchanger RTD output over temperature. The output of the heat exchanger RTD linearization circuit 110 is coupled to the input of an analog-to-digital converter on board 136. The output of the analog-to-digital converter is further corrected for the nonlinearity in the heat exchanger RTD to provide a corrected heat exchanger temperature output. This is achieved by storing the sensor calibration correlation data in the processor 100a in computer 100 and using the calibration data to correct the sensor output.

The meter RTD 128 is coupled to the input of a meter RTD linearization circuit 140 to provide excitation of the meter RTD 128 and to provide correction to the nonlinearity in the meter RTD output over temperature. The output of the meter RTD linearization circuit is coupled to the input of an analog-to-digital converter on board 136. The output of the analog-to-digital converter is further corrected for the nonlinearity in the meter RTD 128 to provide a corrected meter temperature output. This is achieved by storing the sensor calibration correlation data processor 100a and using the calibration data to correct the sensor output.

More preferably, the RTD is a platinum RTD. Preferably the RTD linearization circuitry uses a 0.08 mA excitation current and a three-wire transmitter designed for Platinum RTD temperature sensors. One such suitable transmitter is the XTR103 sold by Burr-Brown Corporation.

Ultrasonic flow meter 76 may be of the Doppler type or the transit time type. Referring to FIG. 4A, preferably the ultrasound flow measurement sensor 76 comprises an ultrasonic transit time meter. Transit time meter 76 may operate in the time mode or the frequency mode. In a preferred embodiment, transit time meter 76 operates in the frequency mode. When operated in this mode, flow meter 76 provides an output signal Qmeter that is directly proportional to the mean velocity of the fluid being measured.

Referring to FIG. 5, preferably signal Qmeter 142 is provided to an A/D converter (via pin 36) of board 102 as follows. Outputs of ultrasound flow meter 76 are coupled to inputs of flow meter processor 144 which converts Qmeter to an output signal Qv, which is an output voltage signal ranging between 0–5 volts. Also, flow meter processor 144 converts Qmeter to an output signal Qi, which is an output current signal ranging between 4–20 mA. Flow meter processor 144 can be a microprocessor based device to acquire the sensor's frequency signal, filter the signal, correct the signal and convert the signal to an analog output proportional to flow rate, such as the GP68 device manufactured by Panametrics or the GF-500 device manufactured by Kaijo of Tokyo, Japan. Typically, such flow meter processors have a relatively slow response time because output signals Qv and Qi are filtered to to eliminate sporadic signals. In a preferred embodiment of the invention, flow meter processor 144 is modified so that output signals Qv and Qi are not filtered, thereby providing a faster response time. Unfiltered output signal Qv or Qi is used as signal Qmeter, which is coupled to input of the A/D converter as described below. Using a Kaijo GF-500 device modified in this way, response times have been achieved to allow for sampling of Qmeter at about 0.1 second intervals.

Figure 4B:
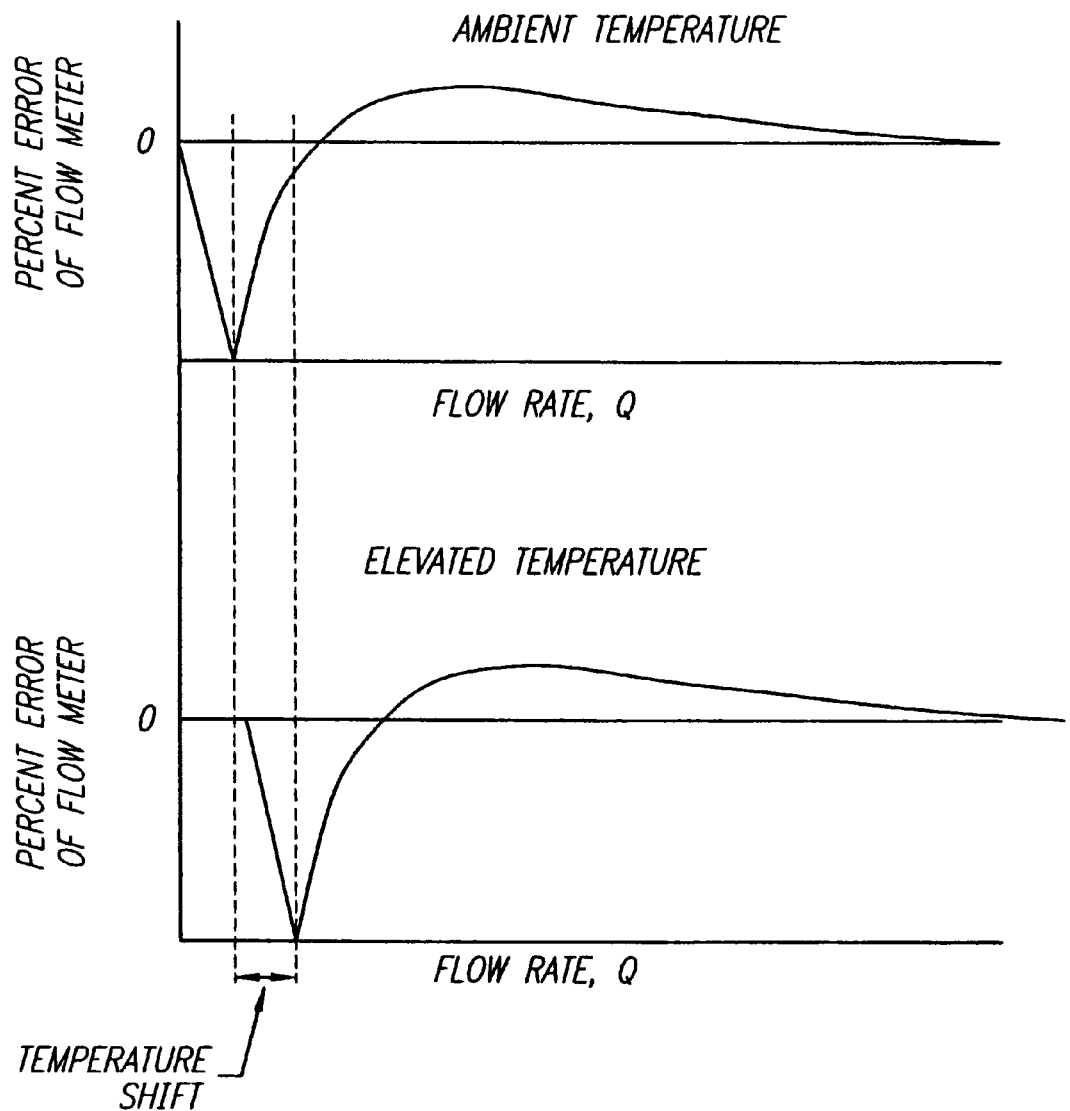
FIG. 4B shows a representative flow rate temperature correction curve for a flow meter and shows how the curve shifts over temperature.

Referring to FIG. 4, output signal Qmeter is coupled to input of an A/D converter on board 136, which provides a digital output signal Qread. In the preferred embodiment the A/D converter is a 16-bit converter, and output Qread is a 16-bit word. One such suitable anolog-to-digital converter is the Diamond-MM-162 analog-to-digital converter sold by Diamond Systems Corporation of Palo Alto, Calif. Qread is used to calculate signal Qcorr which reflects a flow rate corrected to compensate for the known measurement error of flow meter 76 reflected by the calibration curve (FIG. 4B) for a given flow meter. In the preferred embodiment, this linearization is achieved by calculating the shift in the calibration curve of FIG. 4B for the flow meter based on the difference between Tcorr and the reference temperature for the calibration curve and adjusting for this shift in the calibration curve and modifying Qread based on the shifted calibration curve to achieve Qcorr.

Qcorr is further corrected to compensate for changes in the cross-sectional area of the flow measurement conduit 148 (FIG. 1) and provide actual flow rate signal Qact according to the following equation:

$$Qact = Qcorr(1+2\alpha)(Tmeter\ corr - Tref)$$

where $\alpha$=material expansion coefficient of flow measurement conduit, and Tref=reference, which is the temperature of the fluid during the calibration of the system.

FIG. 6 shows a schematic diagram of the preferred RTD temperature measurement circuit using the Burr-Brown XTR103 device. Temperature measurement circuit 140 for measuring the meter temperature at 128 includes external transistors Q2, which is provided to improve the accuracy of the XTR103 over that which can be obtained without such an external transistor, as has been previously known. To further improve the accuracy of the XTR103 device in measuring temperature, resistor R13 has been included. Similarly, transistors Q4, Q6 and Q8 and resistors R14, R15 and R16 are provided in temperature measurement circuits for measuring Tinlet, Theat exch and Tmeter temperatures, respectively. Using this lineariziation circuit has extended the operating range of the preferred RTD from about 0–100° C. to about 0–500° C.

In the preferred embodiment of the invention, each of the outputs of temperature measurement circuits 140, 106 and 110 is coupled to an analog-to-digital converter on board 136. As shown in FIG. 4 and FIG. 5, each of the A/D converters on board 136 provides a digital output signal $T_{read}$ proportional to the process temperatures $T_{input}$, $T_{heat\ exch}$ and $T_{meter}$. In addition, input flow rate signal $Q_{meter}$ is coupled to the input of an analog-to-digital converter on board 136, which provides a digital output signal $Q_{read}$ proportional to Qmeter. Also, pressure signal $P_{meter}$ is coupled to the input of an analog-digital converter on board 136, which provides a digital output signal proportional to $P_{meter}$. Each of signals $T_{read}$, $Q_{read}$ and $P_{read}$ is coupled to the input bus of central processing unit 100a of a general purpose computer 100. Computer 100 is programmed to calculate corrected temperature signal $T_{input\ corr}$, $T_{heat\ exch\ corr}$, and $T_{meter\ corr}$ from signals Tinput read, Theat exch read, and Tmeter read, respectively. In addition, computer 100 is programmed to digitally implement heat exchanger control loop (FIG. 14) to provide a heater control signal, and is programmed to digitally implement a fan control loop (FIG. 14) to provide a fan control signal to fan 58.

In the presently preferred embodiment, analog-to-digital converter on board 136 provides a 16-bit output signal. The general purpose computer 100 is an MSDOS embedded computer.

Again referring to FIG. 4, the preferred embodiment of the invention provides analog output signal proportional to the flow meter temperature (Tmeter). Tmeter is derived from Tmeter corr as follows. Tmeter corr, which is represented by an 80-bit floating point word, is mapped to a 16-bit digital input signal (V) by mapping from a IEEE floating point representation to a 16-bit unsigned integer representation representing a voltage from 0–5 volts. Input signal V is then converted to a series of two 12-bit digital words, one of which are used as alternate input signals a 12-bit D/A converter on board 136. Using a pulse width modulation technique, each of these two input signals is alternately used in the proper proportion so that the time-weighted average of the two signals is essentially equivalent to the sixteen bit resolution. The output of the 12-bit D/A converter is then filtered to remove ripple. As a result, a 12-bit D/A converter can be used to provide an analog output signal having the resolution of a sixteen bit A/D converter but with the significant cost reduction of using a 12-bit D/A converter.

Still referring to FIG. 4, analog output signals for the actual mass flow rate (ACFM), the standard mass flow rate (SCFM) and the pressure (Pmeter) are derived from signals Qact, Qstd, and Pcorr, respectively in the same manner as described in the preceding paragraph.

Figure 9:
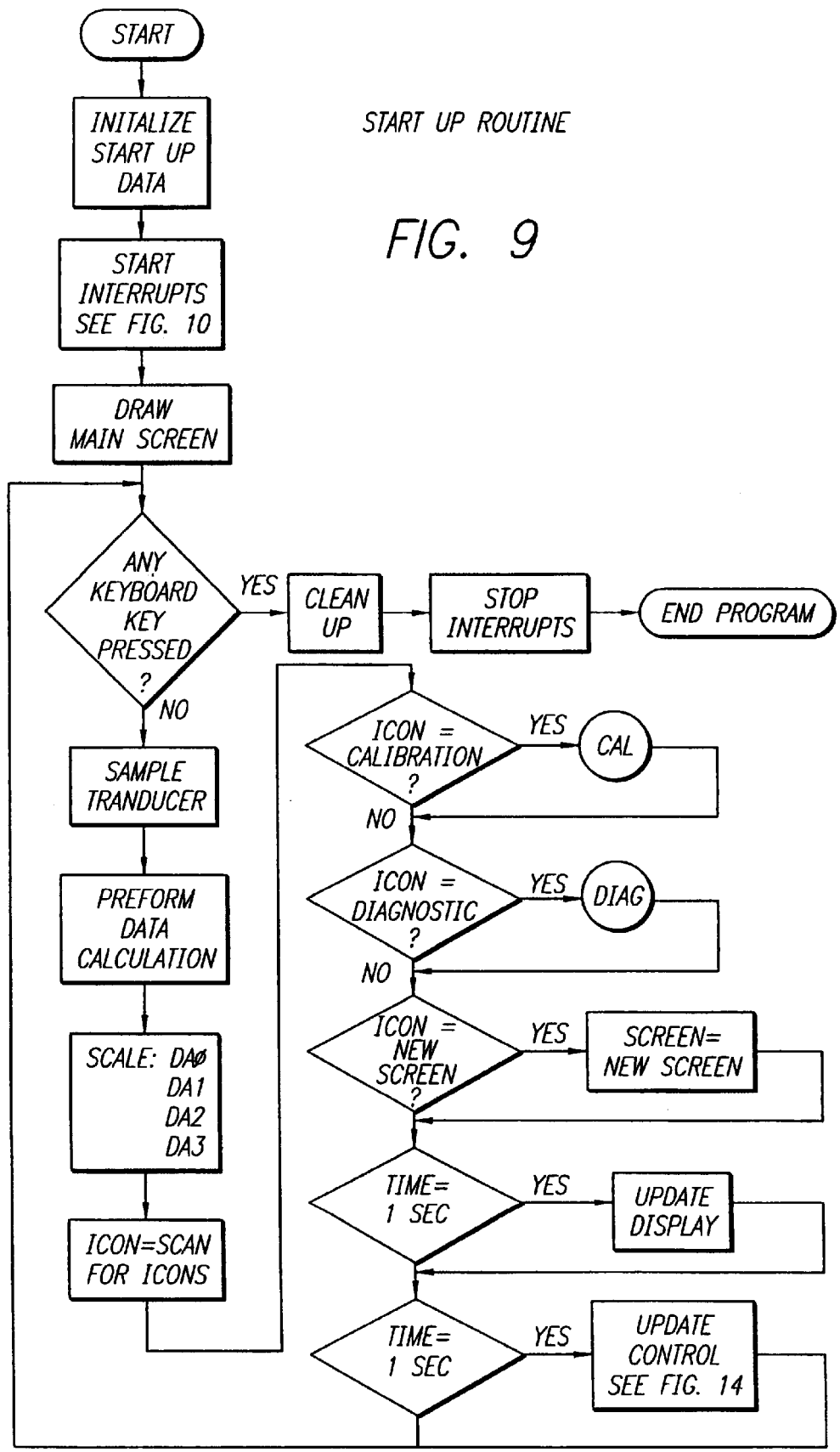
FIG. 9 is a flow diagram illustrating the start-up routine for the embedded software of the gas flow rate measurement apparatus according to the preferred embodiment and method of the invention.
Figure 10:
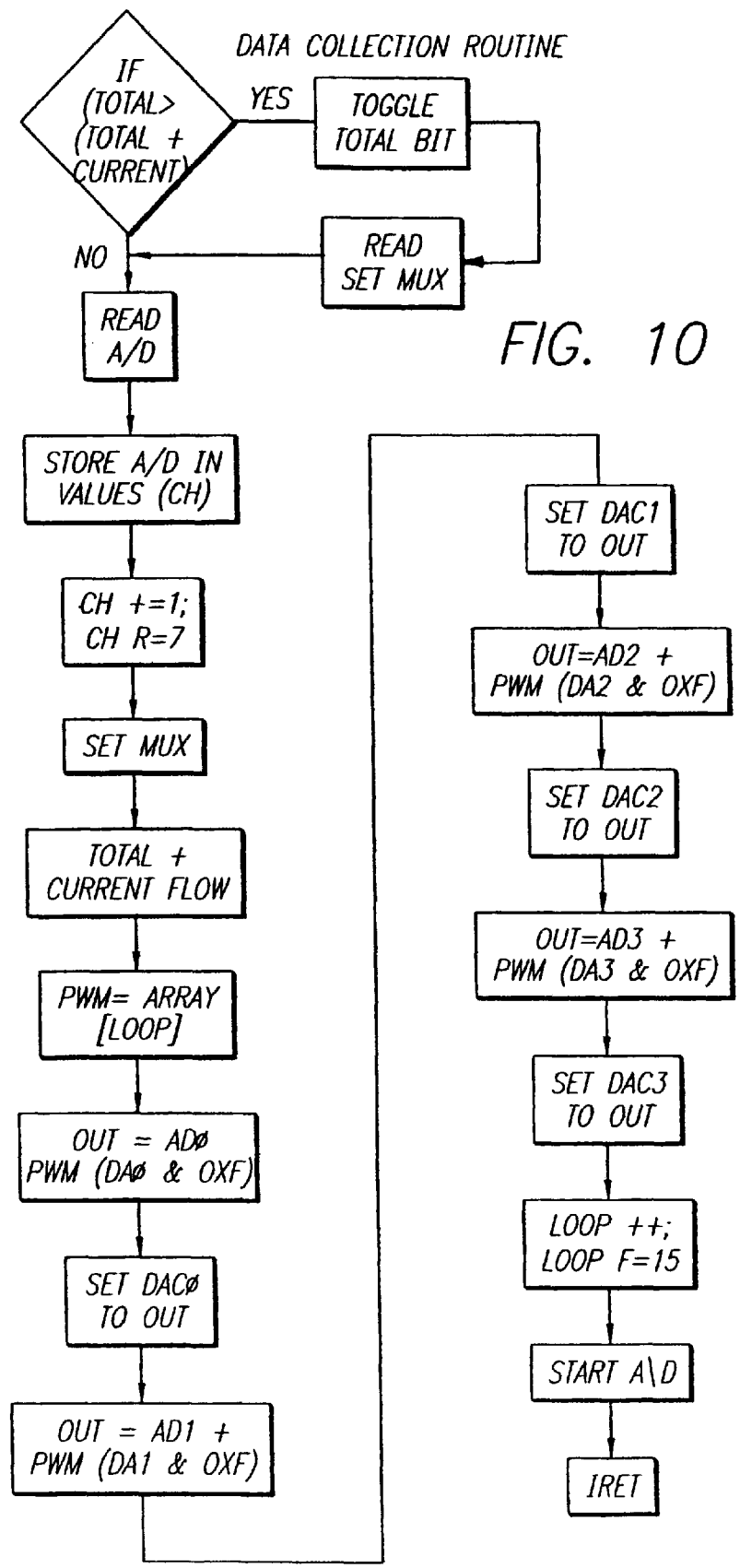
FIG. 10 is a flow diagram illustrating the data collection and output routine analog data for a gas flow rate measurement apparatus according to the preferred embodiment and method of the invention.

Referring to FIG. 9, the flow diagram for the start-up routine for the preferred embodiment of the gas flow rate measurement apparatus and method is shown. After the start function is initiated, start-up data is initialized. This initializes the interface and hardware data structures for use. The Start Interrupts function generates interrupts to run the data collection routine of FIG. 10. In the preferred embodiment, interrupts are generated at a rate of about 4000/second.

The draw main screen function uses the start-up data structures to draw the display interface screen. If any keyboard key is pressed, clean up function will stop the interrupts and end the program. So long as no keyboard key is pressed, the program will continue to run.

Sample transducer function samples captured data and performs scaling and linearization of all analog inputs. Also, this function performs the temperature shift calculation to derive $Q_{corr}$ from $Q_{read}$.

Perform data calculation function calculates Qact from Qcorr to correct for changes in the flow profile and cross-section of the meter conduit 72 due to temperature changes and Qstd using the ideal gas law, as described herein.

Scale function maps the 80-bit floating point values for $T_{corr}$, $Q_{act}$, $Q_{std}$, and $P_{corr}$ to 16-bit integer values to be inputted to digital-to-analog converter.

Figure 12:
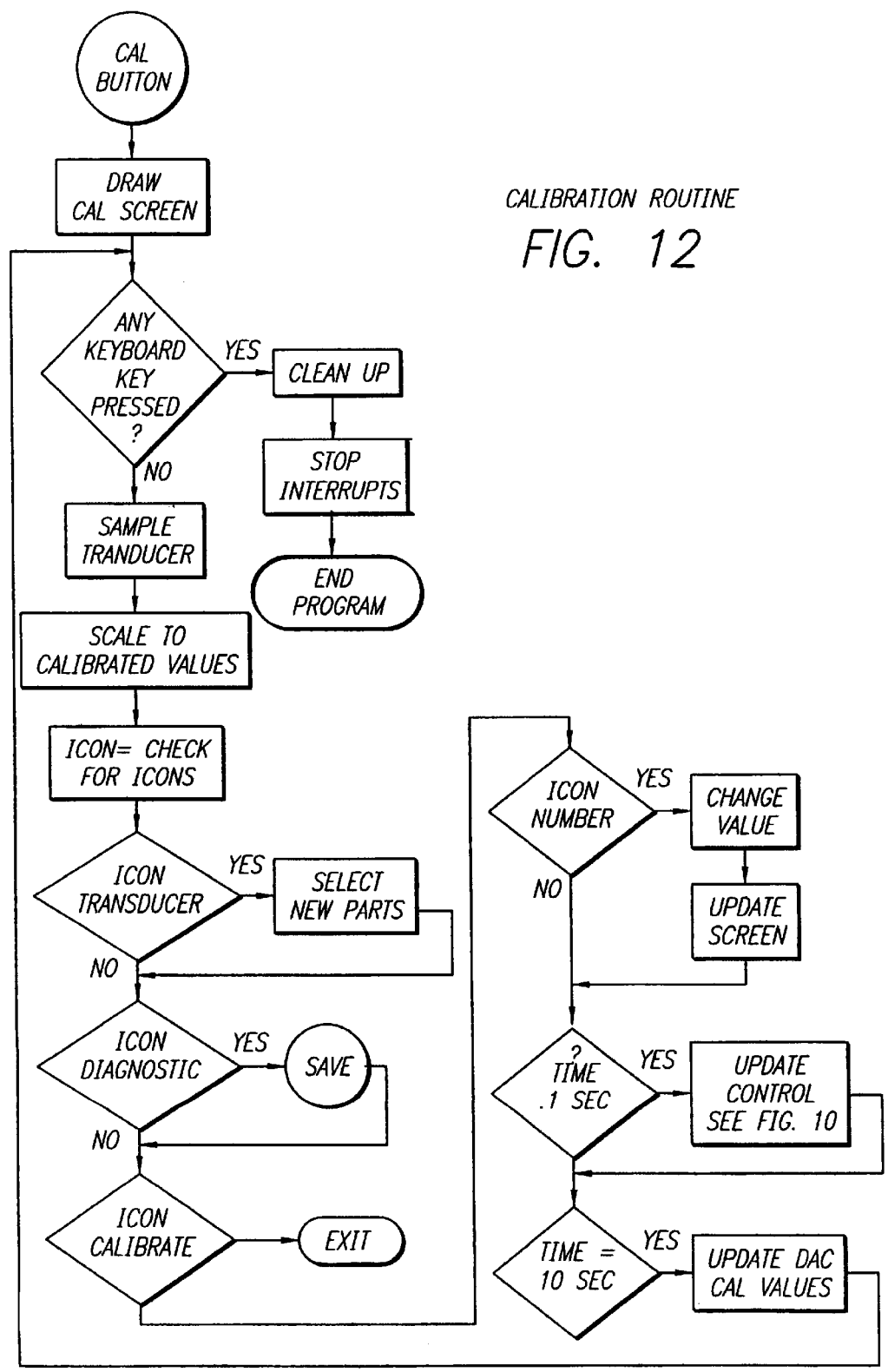
FIG. 12 is a flow diagram illustrating the calibration data entry routine for a gas flow rate measurement apparatus and method according to the preferred embodiment and method of the invention.
Figure 13:
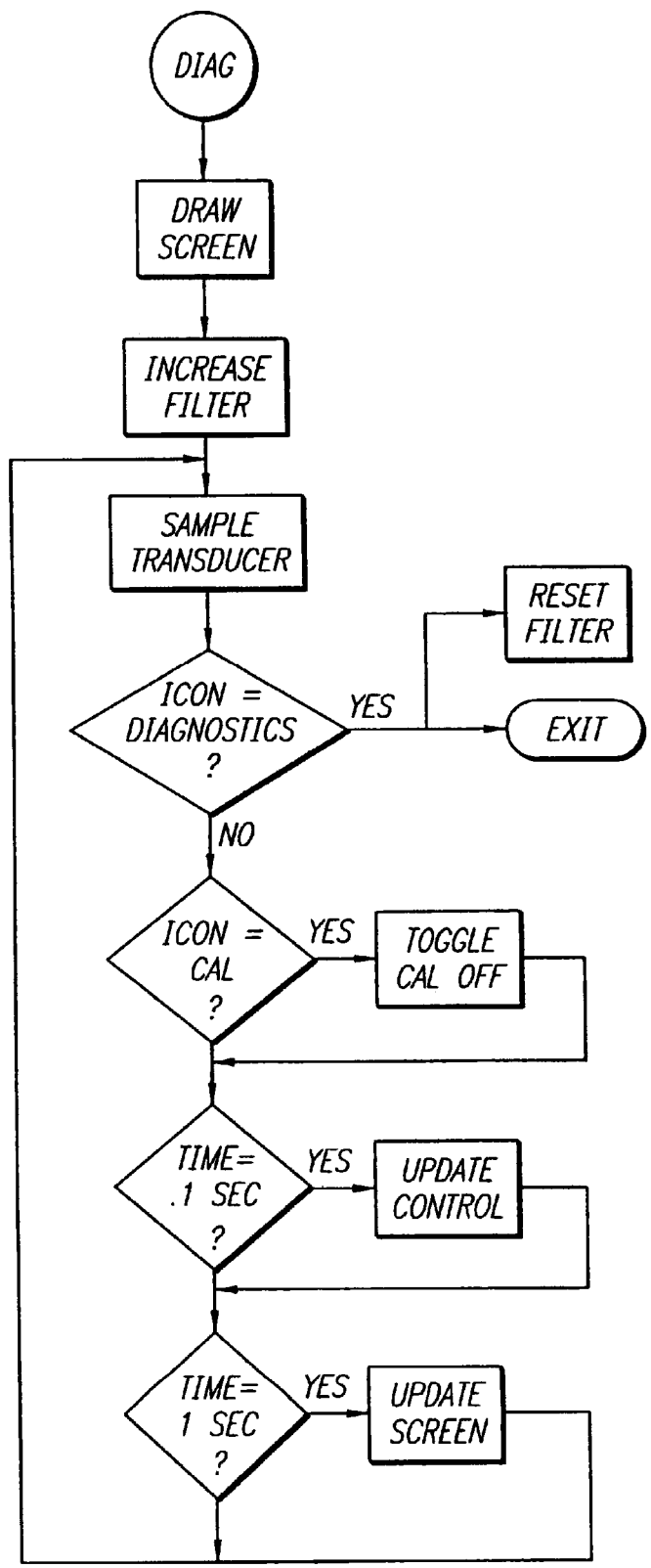
FIG. 13 is a flow diagram illustrating the diagnostics routine for analog inputs for a gas flow rate measurement apparatus according to the preferred embodiment and method of the invention.

The icon scan function queries whether the user of the system has used the touch screen display of the system to request the system to run the calibration routine of FIG. 12 or the diagnostics routine of FIG. 13. The display is updated every second by the update display function. Every 0.1 second, update control function runs the update control routine of FIG. 14.

Figure 11:
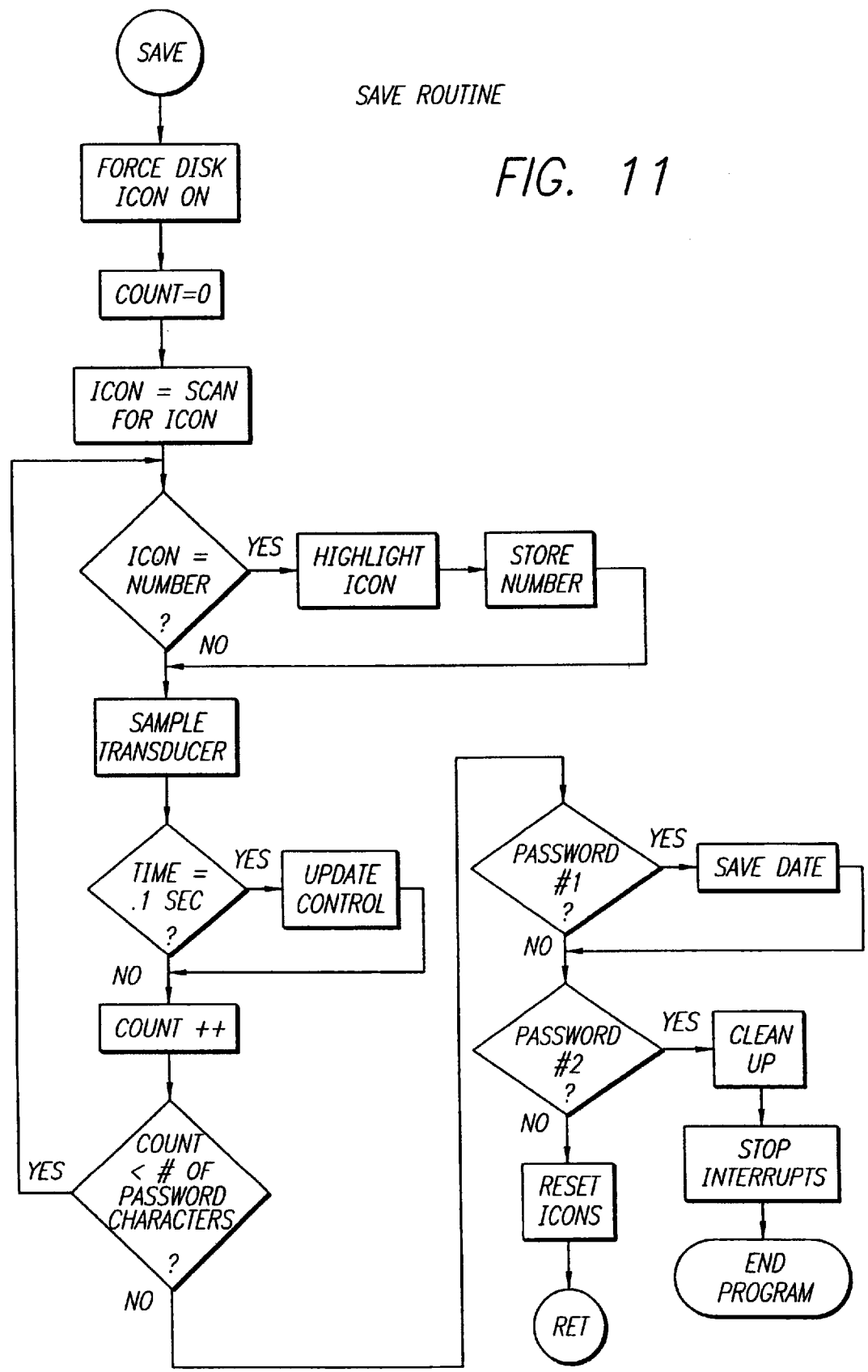
FIG. 11 is a flow diagram illustrating the configuration save routine for calibration data for a gas flow rate measurement apparatus and method according to the preferred embodiment and method of the invention.

Referring to FIG. 11, a flow diagram for the save routine of the preferred embodiment of the gas flow rate measurement apparatus and method is shown. When the save routine is initiated, it saves the then current calibration configuration data to a storage medium, such as the hard disk of the general purpose computer. As illustrated in FIG. 11, password protection is used to prevent unauthorized access to saving data.

Referring to FIG. 12, a flow diagram for the calibration routine of the preferred embodiment of the gas flow measurement apparatus and method is shown, which is used to calibrate the analog outputs Pmeter, Tmeter SCFM and ACFM. The calibration routine includes a scale to calibrated values funcion which calls a routine to get the predetermined calibration data used to map the 80-bit floating point values for Pmeter, Tcorr, Qact and Qstd to 16-bit integers.

Referring to FIG. 13, a flow diagram illustrating the diagnostics routine of the preferred embodiment of the gas flow measurement apparatus and method is shown, which routine is used to build the database of the predetermined calibration data for the calibraion routine.

Figures 1, 14:
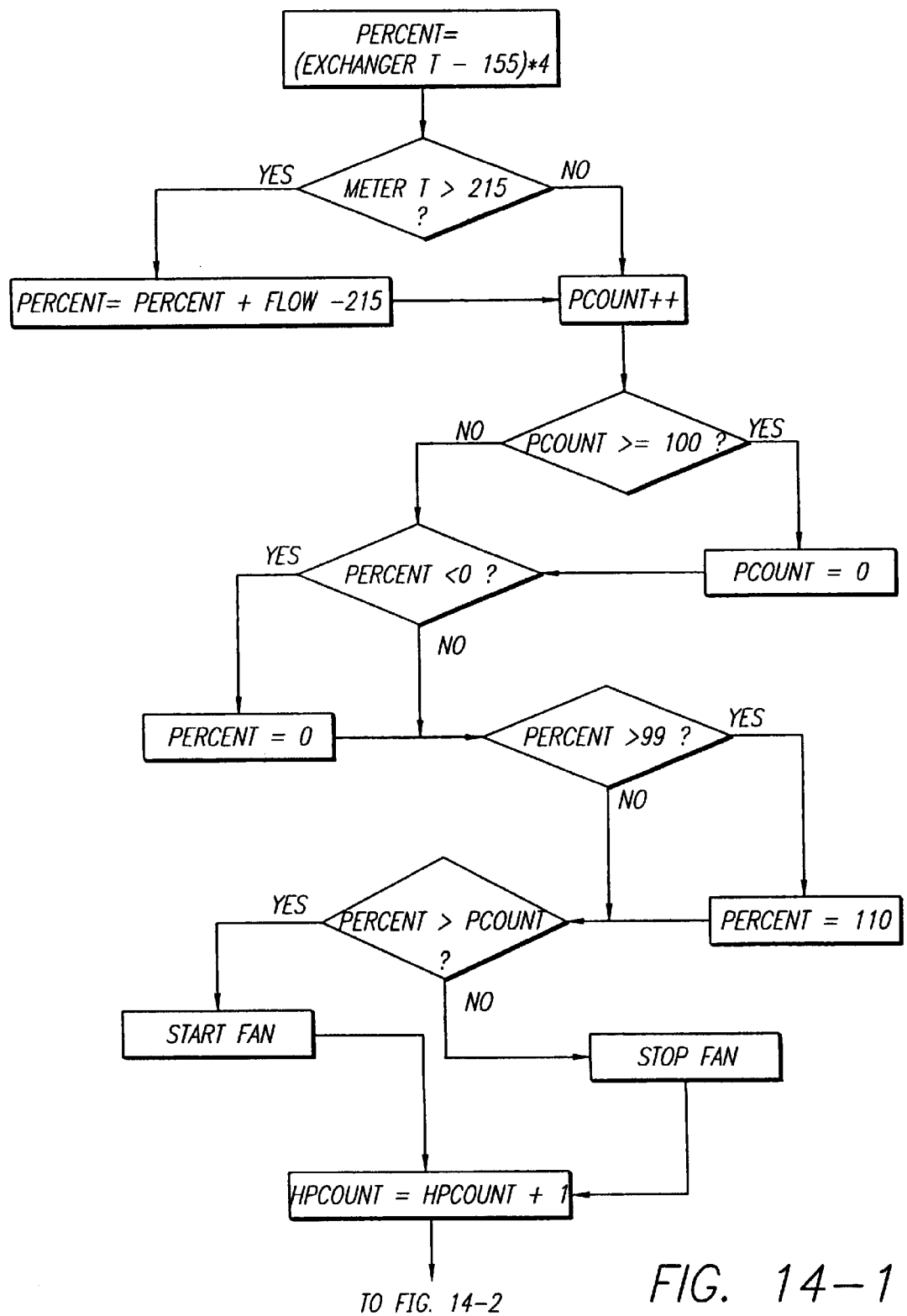
FIG. 14 is a flow diagram illustrating the heating and cooling control routine for gas flow conditioning for a gas flow rate measurement apparatus according to the preferred embodiment and method of the invention.
Figures 2, 14:
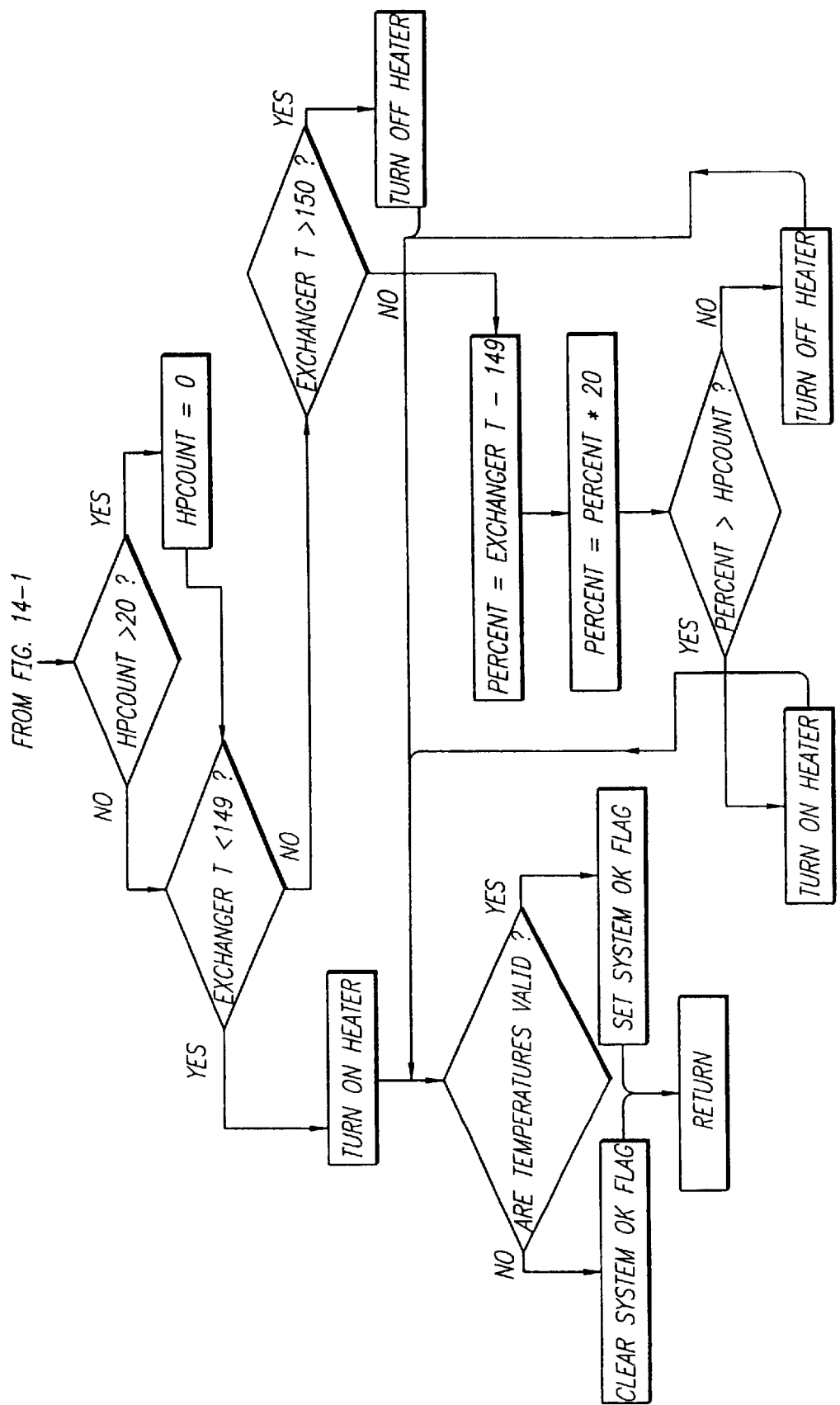

Referring to FIG. 14, a flow diagram illustrating the update control routine of the preferred embodiment of the gas flow measurement apparatus and method is shown. Essentially, this routine implements the fan control loop shown in FIG. 4 comprising temeprature input Tcorr meter and Tcorr heat exchanger as well as the heater control loop comprising Tcorr heat exchanger.

In the presently preferred embodiment, the general purpose computer comprises a personal computer having a 66 mhz Intel 486 central processing unit and utilizing the MSDOS operating system. The functions shown in FIGS. 9–14 are implemented in software programs written in C programming language.

Further in accordance with the invention, a method is provided for obtaining a normalized flow rate of a gas having at least one liquid component. The method may be implemented using system 10 of the preferred embodiment. It will be understood and appreciated, however, that the method is not necessarily limited to system 10 or any other specific hardware and software configuration. For ease of illustration, however, the preferred method will be described in connection with use of system 10 according to the preferred embodiment. In this illustrative example, system 10 is coupled to the exhaust of a vehicle such as a conventional automobile using coupler 16 so that the exhaust gas and emissions from the automobile exhaust are received directly into gas inlet conduit 12 in an essentially air-tight matter. As previously described, the exhaust gas is assumed to be traveling from an upstream position as previously described, and in a downstream direction, also as previously described.

As a preliminary step in the preferred method, system 10 is coupled to the automobile exhaust using coupler 16 as noted. System 10 then is initialized and calibrated as described above.

Once system 10 has been initialized, the automobile engine is started and allowed to idle. During this process, exhaust gases are emitted from the vehicle exhaust and are received at gas inlet conduit 12 at the upstream position 18. Gas inlet cconduit 12 hannels the gas to flow in the downstream direction. In the preferred method, the gas receiving step comprises coupling the gas inlet to an exhaust of an internal combustion engine so the gas flows in a substantially air tight manner, e.g., using coupler 16 as described above.

Also in accordance with the preferred method, the gas receiving step includes inputting heat into the gas prior to the conditioning step. This step may be carried out, for example, using heat blanket 24. Heat is applied so that liquid or partial vapor components are fully converted to the gaseous or vapor state.

The method according to the invention also includes conditioning the gas at a first downstream position to volatize substantially all of the at least one liquid component without adding any other gas. The conditioning means preferably comprises diffusing the gas at a diffusing position as the gas flows downstream relative to the gas inlet.

The conditioning step also comprises inputting thermal energy into the gas downstream of the diffusing position to aid in volatizing or vaporizing the at least one liquid component. The conditioning step may also comprise removing thermal energy from the gas downstream of the diffusing position. These steps may be carried out using heat exchanger 48. The gas preferably is maintained in a range between 150 F. and 250 F.

The conditioning step further comprises throttling the gas at a throttling position downstream of the diffusing position.

The conditioning step also preferably comprises making the flow of the gas more linear using a linear multi-channel flow path, such as by tube bundle 40.

The conditioning step may comprise using a single heat exchange device, such as heat exchanger 48 with heater 54 and fan 58, for transferring thermal energy into and out of the gas prior to the measuring step.

The method according to the invention further includes measuring at least one state variable for the gas and measuring an actual flow rate of the gas at a second downstream position more distant from the upstream position than the first downstream position to generate at least one gas state signal and a flow rate signal, respectively. The gas state measuring step comprises measuring the temperature and pressure of the gas, as described above.

The flow rate measuring step preferably comprises flowing the gas through a flow geometry in the second downstream position which does not substantially alter the flow of the gas.

The flow rate measuring step also preferably comprises measuring the gas flow rate using an ultrasound flow measurement sensor, such as those described aobve for meter or sensor 76.

The flow rate measuring step may comprise measuring the gas flow rate using a radial mass flow meter, as described above.

The method also includes using the at least one gas state signal and the flow rate signal to obtain the normalized mass flow rate. The details of this preferred processing method are presented above and are illustrated in the drawings and therefore will not be repeated here.

The invention provides a number of advantages over prior art systems and methods. At no point during the operation of the system and method is dilution air or gas interjected into the system. This feature considerably simplifies system complexity, reduces cost, and increases system responsiveness. The system and method thus provide greater sensitivity and offer greater flexibility in applications and in practice.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents

What is claimed is:

1. A gas flow rate measurement apparatus for obtaining a normalized flow rate of a gas having at least one liquid component, the gas traveling from an upstream position and in a downstream direction, the gas flow rate measurement apparatus comprising:

a gas inlet conduit in the upstream position for receiving the gas;

a gas flow conditioning section in fluid communication with the gas inlet conduit and in a first downstream position for conditioning the gas to vaporize substantially all of the at least one liquid component without adding any other gas;

a flow rate measurement section in fluid communication with the gas flow conditioning section and in a second downstream position more distant from the upstream position than the first downstream position, the flow rate measurement section including at least one sensor for sensing at least one state variable for the gas and generating at least one gas state signal, and a flow rate sensor for measuring an actual flow rate of the gas and generating a flow rate signal; and a processing device operatively coupled to the flow rate measurement section for using the at least one gas state signal and the flow rate signal to obtain the normalized mass flow rate.

2. A gas flow rate measurement apparatus as recited in claim 1, wherein the gas inlet conduit includes a coupler for coupling to an exhaust of an internal combustion engine in a substantially air tight manner.

3. A gas flow rate measurement apparatus as recited in claim 1, wherein the gas inlet conduit includes a heat source for inputting heat into the gas.

4. A gas flow rate measurement apparatus as recited in claim 1, wherein the gas flow conditioning section comprises a diverging section for diffusing the gas as the gas flows downstream.

5. A gas flow rate measurement apparatus as recited in claim 4, wherein the gas flow conditioning section comprises a converging section located downstream of the diverging section.

6. A gas flow rate measurement apparatus as recited in claim 1, wherein the gas flow conditioning section comprises a diverging section for diffusing the gas as the gas flows downstream, and a converging section located downstream of the diverging section, the diverging section and the converging section being positioned with respect to one another so that they form a plenum for damping oscillations within the gas.

7. A gas flow rate measurement apparatus as recited in claim 1, wherein the gas flow conditioning section comprisings a linear multi-channel flow path.

8. A gas flow rate measurement apparatus as recited in claim 4, wherein the gas flow conditioning section comprises a heat exchanger located downstream of the diverging section for inputting thermal energy into the gas to aid in volatizing the at least one liquid component.

9. A gas flow measurement apparatus as recited in claim 4, wherein the gas flow conditioning section comprises a heat exchanger located downstream of the diverging section for removing thermal energy from the gas.

10. A gas flow rate measurement apparatus as recited in claim 1, wherein the gas flow conditioning section comprises a heat exchanger for transfering thermal energy into and out of the gas.

11. A gas flow rate measurement apparatus as recited in claim 1, wherein the gas state sensor comprises a temperature sensor.

12. A gas flow rate measurement apparatus as recited in claim 11, wherein the temperature sensor has a response time constanct of at most about 2 seconds in moving air.

13. A gas flow rate measurement apparatus as recited in claim 1, wherein the gas state sensor comprises a pressure sensor.

14. A gas flow rate measurement apparatus as recited in claim 1, wherein the flow rate measuring section comprises a flow geometry for the gas which does not substantially alter the flow of the gas in the second downstream position.

15. A gas flow rate measurement apparatus as recited in claim 1, wherein the flow rate sensor comprises an ultrasound flow measurement sensor.

16. A gas flow rate measurement apparatus as recited in claim 1, wherein the flow rate sensor comprises a radial mass flow meter.

17. A gas flow rate measurement apparatus as recited in claim 1, wherein the processor obtains the normalized flow rate Qstd from the actual flow rate signal Qact, a normalized meter temperature signal Tstd, a corrected meter temperature signal Tmetercorr, a normalized pressure signal Pstd and a corrected pressure signal Pcorr according to the formula:

$$Qstd = Qact(Tstd\ Pcorr/Tmetercorr\ Pstd).$$

18. A method as recited in claim 17, wherein the gas receiving step comprises coupling the gas inlet to an exhaust of an internal combustion engine so the gas flows in a substantially air tight manner.

19. A gas flow rate measurement apparatus as recited in claim 17, wherein the gas receiving step includes inputting heat into the gas prior to the conditioning step.

20. A method as recited in claim 17, wherein the conditioning means comprises diffusing the gas at a diffusing position as the gas flows downstream relative to the gas inlet.

21. A method as recited in claim 20, wherein the conditioning step comprises inputting thermal energy into the gas downstream of the diffusing position to aid in volatizing the at least one liquid component.

22. A method as recited in claim 20, wherein the conditioning step comprises removing thermal energy from the gas downstream of the diffusing position.

23. A method as recited in claim 20, wherein the conditioning step comprises throttling the gas at a throttling position downstream of the diffusing position.

24. A method as recited in claim 17, wherein the conditioning step comprising causing the flow of the gas to be more linear using a linear multi-channel flow path.

25. A method as recited in claim 17, wherein the conditioning step comprises inputting thermal energy into the gas to aid in volatizing the at least one liquid component.

26. A method as recited in claim 17, wherein the conditioning step comprises removing thermal energy from the gas prior to the measuring step.

27. A method as recited in claim 17, wherein the conditioning step comprises using a single heat exchange device for transferring thermal energy into and out of the gas prior to the measuring step.

28. A method as recited in claim 17, wherein the gas state measuring step comprises measuring the temperature of the gas.

29. A method as recited in claim 28, wherein the temperature measurement is made using a temperature sensor having a response time constant of at most about 2 seconds.

30. A method as recited in claim 17, wherein the gas state measuring step comprises measuring the pressure of the gas.

31. A method as recited in claim 17, wherein the flow rate measuring step comprises flowing the gas through a flow geometry in the second downstream position which does not substantially alter the flow of the gas.

32. A method as recited in claim 31, wherein the flow rate measuring step means comprises measuring the gas flow rate using an ultrasound flow measurement sensor.

33. A method as recited in claim 31, wherein the flow rate measuring step comprises measuring the gas flow rate using a radial mass flow meter.

34. A method as recited in claim 17, wherein the processing step includes conditioning at least one of the at least one gas state signals and the flow rate signals using pulse width modulation.

* * * * *